United States Patent
Tanaka et al.

[11] Patent Number: 5,998,042
[45] Date of Patent: Dec. 7, 1999

[54] ROLLING BEARING AND ROLLING DEVICE

[75] Inventors: Susumu Tanaka; Kenji Yamamura; Manabu Ohori, all of Kanagawa, Japan

[73] Assignee: NSK Ltd., Tokyo, Japan

[21] Appl. No.: 08/733,451

[22] Filed: Oct. 18, 1996

[30] Foreign Application Priority Data

| Oct. 19, 1995 | [JP] | Japan | 7-271111 |
| Feb. 23, 1996 | [JP] | Japan | 8-036734 |
| Oct. 11, 1996 | [JP] | Japan | 8-269781 |

[51] Int. Cl.$^6$ ................................ B32B 15/04
[52] U.S. Cl. .................... 428/627; 428/632; 428/685; 384/490; 384/492
[58] Field of Search ................... 428/685, 627, 428/632, 641, 698, 702; 420/34; 384/490, 492

[56] References Cited

U.S. PATENT DOCUMENTS

| 4,966,751 | 10/1990 | Kaede et al. | 420/34 |
| 5,030,017 | 7/1991 | Murakami et al. | 384/492 |
| 5,084,116 | 1/1992 | Mitamura | 148/319 |
| 5,122,000 | 6/1992 | Matsumoto et al. | 384/492 |
| 5,507,580 | 4/1996 | Dezzani et al. | 384/492 |
| 5,575,571 | 11/1996 | Takebayashi et al. | 384/492 |
| 5,639,168 | 6/1997 | Noguchi et al. | 384/492 |

FOREIGN PATENT DOCUMENTS

| 61-163244 | 7/1986 | Japan. |
| 7-119750 | 5/1995 | Japan. |

*Primary Examiner*—Paul J. Thibodeau
*Assistant Examiner*—Holly C. Rickman
*Attorney, Agent, or Firm*—Sughrue, Mion, Zinn, Macpeak & Seas, PLLC

[57] ABSTRACT

A rolling device includes: an outer member; an inner member; and a plurality of rolling elements arranged between the outer and inner members, the outer member having a first contact surface which contacts the rolling elements, the inner member having a second contact surface which contacts the rolling elements, each of the rolling elements rolling against the first and second contact surfaces. At least one of the outer member, inner member, and rolling elements is formed of steel containing: C of less than 0.6 wt %; Cr of 10.0 wt % to 22.0 wt %; Mn of 0.1 wt % to 1.5 wt %; Si of 0.1 wt % to 2.0 wt %; N from 0.05 wt % to less than 0.2 wt %; Mo of 0 to 3.0 wt %, and V of 0 to 2.0 wt %; and the balance Fe and inevitable impurities, the steel satisfying C %+N % $\geq$ 0.45 wt % and containing retained austenite of $\leq$ 6 vol %. The rolling device has excellent characteristics in fatigue strength, wear resistance, corrosion resistance, and acoustic characteristic.

6 Claims, 9 Drawing Sheets

LOAD P

ROTATIONAL DIRECTION

ROTATIONAL DIRECTION

LUBRICANT

ROLLING BEARING AND ROLLING DEVICE

BACKGROUND OF THE INVENTION

The present invention relates to improvements of a rolling bearing for use in a precision equipment, a food machine, and a semiconductor-related equipment, and improvements of a linear guide apparatus, and a ball screw (hereinafter called generally a rolling device). In particular, the present invention relates to improvements of material compositions of component parts to enhance the function of the rolling device.

In a precision equipment, a food machine, a semiconductor-related equipment and the like, various kinds of rolling devices such as a rolling bearing, a linear guide (linear guide apparatus), and a ball screw are employed conventionally. Each of these rolling devices includes component parts of an outer member, an inner member and rolling elements, while the rolling elements are structured such that they can be rolled not only with respect to a first contact surface, which is the contact surface of the outer member with the rolling elements, but also with respect to a second contact surface which is the contact surface of the inner member with the rolling elements. In particular, the term "the outer member of the rolling device" is used here to indicate an outer race in a rolling bearing, a slider or a guide rail in a linear guide, and a nut in a ball screw. Also, the inner member of the rolling device is used here to indicate an inner race in a rolling bearing, a guide rail or a slider in a linear guide, and a screw shaft in a ball screw.

Therefore, referring to the first contact surface which is the contact surface of the outer member with the rolling elements and the second contact surface which is the contact surface of the inner member with the rolling elements, in the case of the rolling bearing, the raceway surface of the outer race is the first contact surface and the raceway surface of the inner race is the second surface; also, in the case of the linear guide, the raceway groove of the slider (or guide rail) is the first contact surface and the raceway groove of the guide rail (or slider) is the second contact surface; and, further, in the case of the ball screw, the screw groove of the nut is the first contact surface and the screw groove of the screw shaft is the second contact surface.

As for material used to form not only balls and various rollers serving as the rolling elements of the rolling bearing or other rolling devices but also the inner and outer races, slider, nut, and screw shaft serving as the inner and outer members of the rolling bearing and rolling device, SUJ2 is generally employed for bearing steel. Also steel material corresponding to SCR420 is employed for case hardening steel. Since the rolling bearing or other rolling device is used under high contact pressure with repetitive shearing stresses applied thereto, the bearing steel is hardened and tempered, while the case hardening steel is carburized or carbonitrided and is then hardened and tempered in order to stand such shearing stresses and secure a necessary rolling fatigue strength. Hence, the bearing steel and case hardening steel can have the hardness in the range of $H_RC$ 58–64. However, the rolling bearing or other rolling device is used under various environments. For example, when the rolling bearing formed of SUJ2 or the steel material corresponding to SCR420 is used under a corrosive environment such as a water or seawater mixed environment, a wet environment, or other similar environments, the rolling bearing gathers rust and thus cannot be used in an early stage. In view of this, especially, in the rolling bearing and rolling device for use in a precision equipment, a food machine and the like in which the rust gathering must be avoided, there has been conventionally used martensitic steel SUS440 or the like as high chromium stainless bearing steel which is excellent in corrosion resistance and has the hardness of $H_RC$ 58 or more necessary for the bearing.

Under the corrosive environments such as the water or seawater mixed environment, the wet environment and the like, generally, relatively neutral water having pH 5–9 adheres to the rolling device. Also, in special cases, the rolling device is used in a special solution such as a weak acid solution, a halide solution or the like, or in steam. Especially, in the case of a reducing acid such as a sulfuric acid, a hydrochloric acid or the like, even if several % of such acid is contained in water, such acid can attack and corrode heavily the passivated film (film oxide) of the stainless steel so that the stainless steel is forced to reach its corrosion life. In such case, a surface treatment such as a hard Cr plating treatment, a fluoride plating treatment or other similar treatment must be given to the rolling device before it can be practically used.

However, in the high chromium stainless steel, when the contents of C and Cr are higher, a problem arises. For example, when it contains 0.6 wt % of C or more, due to combination of such carbon with a large amount of chromium, there are produced a large number of eutectic carbides each having a large size of 10 $\mu$m or more, which not only reduces the fatigue strength, toughness, corrosion resistance, workability and the like of the high chromium stainless steel but also deteriorates the forgiability, machinability and the like of the high chromium stainless steel.

Also, the existence of the large-size eutectic carbides raises another problem that it has an undesirable influence on the acoustic characteristic of the rolling bearing and rolling device. The term "acoustic characteristic" expresses the degree of the low levels of the noise that is produced by vibrations generated due to operation of the rolling bearing or other rolling device. This does not matter so much in a machine tool, a construction machine, and the like. However, in a relatively small-size stainless steel ball bearing for use in a precision equipment such as HDD, VTR or the like which detests vibrations bitterly, the deteriorated acoustic characteristic provides a significant problem. That is, the vibrations generated in the rolling bearing or other rolling device depend greatly on the dimensional precision of the inner and outer members and rolling elements. For this reason, when the rolling bearing or other rolling device is formed of such material as contains the large-size eutectic carbides, the large-size eutectic carbides provide a factor to impede the accomplishment of the precision in finishing component parts of the rolling device. Also, during use of the rolling device, a wear difference between the base material of the rolling device and the eutectic carbides is produced to thereby cause the precision of roughness and the like of the rolling device to be lowered, that is, to provide a precision reducing factor, which results in the increased noise. Here, such lowered acoustic characteristic can be caused not only by the above-mentioned large-size eutectic carbides but also by the amount of retained austenite.

Such large-size eutectic carbides not only lower the acoustic characteristic of the rolling bearing and rolling device, but also provide a source of concentrated stresses to lower the fatigue strength as well as deteriorate the toughness and corrosion resistance of the rolling bearing and rolling device. Therefore, it is not preferable that the large-size eutectic carbides exist in the material of the component parts of the rolling device.

Also, when the rolling bearing or other rolling device is used under a poor lubrication condition, for example, in an extreme case such as in the water, it is necessary to have good corrosion resistance. On the other hand, as for the life of the rolling bearing and rolling device, a wear resistance is especially important.

When the inner and outer members and the rolling elements are respectively formed of ordinary material such as SUS440C or the like, if the rolling device is used under a severe condition such as in the water, then no oil film is produced between the rolling elements and the first contact surface which is the contact surface of the outer member with the rolling elements, or the second contact surface which is the contact surface of the inner member with the rolling elements. Accordingly, since the rolling elements are directly contacted with the inner and outer members, the damage form of the rolling device is represented by the lowered life or precision due to wear or corrosion but not the flaked strength. As an example, such heavy wear in the ball bearing can be reduced greatly by using ceramics such as silicon nitrides or the like as the material of the rolling elements. In this case, by using the ceramics as the material of only the rolling elements, not only an increase in the cost of the rolling bearing can be minimized but also the function of the rolling bearing can be improved outstandingly. When ordinary material such as SUS440C or the like is used for the races and ceramics is used for the rolling elements, the amount of wear of the rolling bearing can be reduced greatly to thereby be able to extend the life of the rolling bearing when compared with a case in which the races and rolling elements are all formed of SUS440 material, while the damage form of the rolling bearing shows a flaked damage involved with wear and corrosion, However, since ceramics are little deformed elastically, the race in contact with ceramics receives a higher contact pressure when compared with a case in which stainless steel is used for the rolling elements, so that the race can be flaked and damaged starting from the large-size eutectic carbides contained therein. For this reason use of ceramics cannot improve the life of the rolling bearing sufficiently. Also, the SUS440C material is insufficient in corrosion resistance, that is, when a rolling bearing formed of the SUS440C material is exposed under a corrosive environment such as in the water for a long time of period, the bearing corrodes and gathers rust starting from the Cr shortage layer in the periphery of the eutectic carbides, so that the precision of the bearing such as the roughness or the like is lowered to thereby reduce the life of the bearing. When the SUS440C material corrodes excessively, the rolling bearing cannot be used any longer.

On the other hand, in the case of the ball bearing that is built in a compact equipment such as an HDD, a VTR or the like, as the equipment becomes portable, a possibility that shocking loads are applied to the ball bearing is increased. In this case, since the ball bearing is small in size, even if the shocking load to be given to the ball bearing is relatively small, the races of the ball bearing can be deformed permanently to thereby deteriorate the acoustic characteristic of the equipment or generate variations in a rotation torque thereof, which results in the deteriorated performance of the equipment. Such permanent deformation occurs because the retained austenite contained in the steel forming the races shows a low yield stress.

The amount of the retained austenite can be reduced to almost 0% by tempering the races at a temperature of about 240° C. when the races are formed of SUJ2, so that it is possible to improve the impact resistance of the ball bearing.

However, as previously described, SUJ2 raises a problem that it has not sufficient corrosion resistance.

On the other hand, when the races of the ball bearing are formed of ordinary stainless steel such as SUS440C or the like having some corrosion resistance, even if the races are subzero treated after they are hardened, there is still left about 8–12 wt % of retained austenite and, further, this retained austenite is stabler than in the case of bearing steel, that is, it is little dissolved unless it is tempered at temperatures of 400–600° C. Besides, although the retained austenite can be dissolved by tempering it at temperatures in the range of 400–600° C., the hardness of the races is softened down to $H_RC$ 55–57 or less to thereby lower the rolling fatigue strength, wear resistance and the like of the races, which results in the shortened life of the rolling bearing including such races.

In addition, another problem arises. That is, in the above tempering process, Cr contained in the base material of the bearing is caused to separate from the present base material in the form of carbides. Not only the thus separated carbides are softened as the tempering temperature rises, but also the existence of such carbides lowers the corrosion resistance of the races to a great extent.

Unexamined Japanese Patent Publication No. Sho. 61-163244 discloses a rolling bearing of stainless steel in which formation of eutectic carbides is restricted by reducing the contents of C and Cr, so that the acoustic characteristic, fatigue strength and the like of the rolling bearing can be improved to a great extent. However, this disclosure does not teach any clear description as to the dimensional stability of the rolling bearing, the impact resistance of the rolling bearing caused by the amount of retained austenite, the wear resistance of the rolling bearing in the case where it is subjected to the tempering process at a high temperature, and the corrosion resistance of the rolling bearing. Various problems as described above in the rolling bearing may arise similarly in rolling device such as the linear guide and ball screw.

SUMMARY OF THE INVENTION

The present invention aims at eliminating the various problems found in a conventional rolling bearing and rolling device. Accordingly, it is a first object of the invention to provide a rolling bearing or other rolling device which, with a relationship between carbon and nitrogen contained in a bearing material composition having excellent corrosion resistance taken into consideration, is improved in fatigue strength and wear resistance, corrosion resistance, acoustic characteristic, and the like.

Also, it is a second object of the invention to provide a rolling bearing or other rolling device which, by adding a specific element to the above-mentioned composition, is improved in pore corrosion resistance and is enhanced in strength due to generation of secondary hardening in a tempering process.

Further, it is a third object of the invention to provide a high-function rolling bearing or other rolling device which, by restricting the sizes of eutectic carbides, nitrides and carbon nitrides contained in the bearing material, can eliminate the reduction of the acoustic characteristic, fatigue strength, toughness and the like caused by the large-size eutectic mixtures so as to improve fatigue strength and wear resistance, corrosion resistance, acoustic characteristic, toughness and the like.

Moreover, it is still another object of the invention to provide a rolling bearing or other rolling device which is especially excellent in corrosion resistance and fatigue strength as well as is high in wear resistance, so that it can be used even under a poor lubrication environment such as in the water or the like where there is a possibility that steel can be easily worn and corroded to thereby lower the life of the ball bearing.

Still Further, in the case of a rolling device to be used under a special corrosive environment including a reducing acid, a halide or the like which is severer than the poor lubrication environment such as the underwater environment or the like, when the conventional surface treatment such as the black chrome plating treatment or the like is employed, not only the cost thereof is very high but also, due to the motion of the rolling elements, the surface treatment is easy to come off and is thus insufficient in durability as well. On the other hand, when austenitic stainless steel is employed as represented by SUS304, SUS316 or the like which is excellent in resistance to an acid, such stainless steel is lacking in hardness and thus it cannot be used for such rolling device which receives a high contact pressure. Accordingly, it is a fourth object of the invention to provide a rolling device which can be used more advantageously than the conventional rolling devices even under the above-mentioned special corrosive environment.

The present inventors, by reducing such concentration of carbon contained in steel that has an undesirable influence on the corrosion resistance of the steel and, instead, by adding nitrogen having a similar solid solution strengthening action to carbon, have studied how the nitrogen/carbon concentration influences the corrosion resistance, high-temperature temper hardness or the like of the steel as well as have studied the influences of other alloy components. The result of studies shows that, if the carbon concentration is reduced and nitrogen is added instead, then (1): the formation of large-size eutectic carbides can be restricted to thereby improve the corrosion resistance of the steel greatly over the conventional stainless steel; (2) when the steel is tempered at high temperatures, minute nitrides (including carbon nitrides) and the like are deposited and are then hardened secondarily, which can restrict the softening of the steel that occurs in the conventional stainless steel to thereby improve the wear resistance and corrosion resistance of the steel; and, further (3): if the components of the steel are designed such that the content of carbon is less than 0.5%, and $0.04 \text{ Cr \%} - 0.83 \text{ N \%} - 0.39 \leq \text{C \%} \leq -0.05 \text{ Cr \%} + 1.41$ can be satisfied, then it is possible to restrict the formation of δ ferrite and large-size eutectic carbides harmful to the toughness, corrosion resistance, life and the like of the steel. That is, the present invention has been made on the above-mentioned studies.

In attaining the above objects, according to the invention, a rolling device (A) includes outer and inner members, rolling elements arranged between the outer and inner members, the outer member having a first contact surface which contacts the rolling elements, the inner member having a second contact surface which contacts the rolling elements, each of the rolling elements rolling against the first and second contact surfaces, in which at least one of the outer member, inner member, and rolling elements is formed of stainless steel containing, by weight percentage, C; less than 0.6%, Cr; 10.0% to 22.0%, Mn; 0.1% to 1.5%, Si; 0.1% to 2.0%, N; 0.05% to less than 0.2%, the balance Fe, and inevitable components, the steel satisfying $0.04 \text{ Cr \%} - 0.83 \text{ N \%} - 0.39 \leq \text{C \%} \leq -0.05 \text{ Cr \%} + 1.41$, and $\text{C \%} + \text{N \%} \geq 0.45\%$.

Here, the alloy composition of the stainless steel used in at least one of the inner member, outer member and rolling elements of the rolling device (A) according to the invention can further include, in addition to the above-mentioned alloy composition, Mo; 3.0 wt % or less, and V; 2.0 wt % or less, selectively.

Also, the composing or forming material of at least one of the inner member, outer member and rolling elements of the rolling device (A) according to the invention can have the above-mentioned alloy composition of the stainless steel and, at the same time, the eutectic carbides or nitrides (including carbon nitrides) contained in the composing material have a major diameter of 20 µm or less and the hardness of $H_RC$ 58 or more after they are hardened, subzero treated and tempered, so that the present rolling device (A) is excellent in the acoustic characteristic as well as has not only high fatigue strength but also high corrosion resistance.

Further, in the rolling device (A) according to the invention, the composing material of at least one of the inner member, outer member and rolling elements has an alloy composition further containing Mo; 3.0 wt % or less and V; 2.0 wt % or less selectively in addition to the alloy composition of the above-mentioned stainless steel and, at the same time, the eutectic carbides or nitrides (including carbon nitrides) contained in the composing material have a major diameter of 20 µm or less and have the hardness of $H_RC$ 58 or more after they are hardened, subzero treated and are then tempered at temperatures in the range of 400 to 600° C., so that the present rolling device (A) is excellent in the acoustic characteristic thereof and has not only high fatigue strength but also high wear resistance.

Still further, in the rolling device (A) according to the invention, the composing material of at least one of the inner member, outer member and rolling elements is selected from the above-mentioned alloy compositions and the amount of the retained austenite ($\gamma_R$) of the present composing material is 6 vol % or less, so that the present rolling device (A) is excellent in acoustic characteristic and impact resistance.

On the other hand, the present inventors have studied the heat treatment characteristics of the above-mentioned types of steel in detail and have examined a correlation between corrosion resistance and heat treatment characteristic or micro structures. As a result, it is found that excellent corrosion resistance can be obtained by restricting the size and quantity of undissolved carbides contained in the steel base material.

In view of this, according to another aspect of the invention, a rolling device (B) includes an inner member, an outer member and rolling elements, in which at least one of the inner member, outer member and rolling elements is formed of stainless steel having an alloy composition containing, by weight percentage, C; less than 0.5%, Cr; 10.0% to 14.0% or less, preferably, further containing Mn; less than 1.0%, Si; 2.0% or less, Mo; 3.0% or less, V; 2.0% or less, N; 0.05% to 0.14% or less, while (C+N)% is so set as to satisfy $0.45\% \leq (C+N)\% \leq 0.65\%$.

Also, according to the rolling device (B), since any eutectic carbides and other undissolved carbides are not present in the above-mentioned stainless steel after it is hardened, subzero hardened, and tempered, or since such carbides, if any, are 2 µm or less in size and are 5% or less by area fraction, so that the present rolling device (B) is excellent especially in acoustic characteristic and corrosion resistance.

Further, the present inventors have also studied the life of a hybrid rolling device in which rolling elements are formed of ceramics and inner and outer members are formed of stainless steel, when it is used under a severe lubrication and corrosion environment (in the water).

The result of study shows that, if a rolling device is structured by using ceramics for the rolling elements and stainless steel for the inner and outer members, then the amount of wear can be reduced to a great extent and the life of the rolling device can be extended when compared with a rolling device which is wholly formed of stainless steel, and also that the life of the rolling device depends greatly on the sizes and wear resistance of the eutectic carbides contained in the hybrid rolling device.

In view of this, according to still another aspect of the invention, a rolling device (C) in which, one or both of the inner and outer members are formed of stainless steel having a composition containing, by weight percentage, C; less than 0.5%, Cr; 10.0% to 22.0% or less, Mn; 0.1% to 1.5% or less, Si; 0.1% to 2.0% or less, Mo; 3.0% or less, V; 2.0% or less, S; 0.030% or less, P; 0.030% or less, O; 100 ppm or less, and N; 0.05% to less than 0.2%, and also satisfying 0.04 Cr %–0.83 N %–0.39≦C %≦–0.05 Cr %+1.41 and C %+N %≧0.45%, and also in which the rolling elements of the rolling device are formed of ceramics material such as silicon nitride, zirconia, silicon carbide or the like.

Also, according to the rolling device (C), the eutectic carbides or nitrides (including carbon nitrides) contained in the stainless steel forming the inner and outer members of the rolling device are 20 μm or less in the major diameter and have the hardness of $H_RC$ 58 or more after they are hardened, subzero hardened, and tempered, and the rolling elements of the rolling device are formed of ceramics of silicon nitride, zirconia, silicon carbide or the like.

Further, the tempering temperatures of the rolling device (C) can be set in the range of 400 to 600° C.

In addition, according to yet another aspect of the invention, a rolling device (D) includes an inner member, an outer member and rolling elements, in which at least one of the inner and outer members and the rolling elements is formed of stainless steel having a composition containing, by weight percentage, C; less than 0.5%, Cr; 10.0% to 14.0% or less, Mn; 1.0% or less, Si; 2.0% or less, Mo; 3.0% or less, V; 2.0% or less S; 0.030% or less, and N; 0.05% to 0.14% or less, and further (C+N)% being so set as to satisfy 0.45%≦(C+N)%≦0.65%, and also in which the rolling elements of the rolling device are respectively formed of ceramics such as silicon nitride, zirconia, or silicon carbide.

According to the rolling device (D), the above-mentioned stainless steel forming the inner and outer members of the rolling device can be structured such that it does not contain eutectic carbides and other undissolved carbides at all after it is hardened, subzero hardened, and tempered, or that, such carbides, if any, are 2 μm or less in size and 5% or less by area fraction.

Further, the present inventors studied how to improve not only the rolling life, acoustic characteristic and corrosion resistance of the rolling device under a general environment but also the corrosion resistance of the rolling device under a special environment including a solution containing a reducing acid such as a sulfuric acid, a hydrochloric acid or the like, a solution containing a halide, and other similar solutions. As a result of study, it has been found that, by adding a proper amount of Ni and Cu to the alloy composition of the rolling device, it is possible to provide a rolling device such as a rolling bearing or the like which is remarkably improved in corrosion resistance to a reducing acid such as a sulfuric acid, a hydrochloric acid or the liket does not cause large-size eutectic carbides to be generated, can enjoy an excellent rolling fatigue characteristic as well as an excellent acoustic characteristic, and can be used more advantageously than the conventional rolling devices.

Therefore, according to the invention, a rolling device (E) includes an outer member, an inner member and rolling elements, characterized in that at least one of the outer member, inner member and rolling elements is formed of stainless steel containing, by weight percentage, C; less than 0.5%, Cr; 10.0% or more to 16.0% or less, Mn; 0.1% or more to 0.8% or less, Si; 0.1% or more to 2.0% or less, N; 0.05% or more to 0.2% or less, Mo; 3.0% or less, V; 2.0% or less Ni; 0.05% (preferably 0.5%) or more to 3.5% or less, Cu; 0.05% (preferably 0.5%) or more to 3.0% or less, the balance Fe, and unavoidable components, and the steel satisfying 0.04 Cr %–0.83 N %–0.39≦C %≦–0.05 Cr %+1.41 and C %+N %≧0.45%, Ni %+2.4 Mn %+0.3 Cu %≦5.0%.

Moreover, a rolling device may be assembled with an inner member, an outer member and rolling elements in which at least one of the outer and inner members is formed of stainless steel specified in the rolling device (E) and the rolling elements are formed of ceramics such as silicon nitride, zirconia, or silicon carbide.

DETAILED DESCRIPTION OF THE PREFERRED EMBODIMENTS

Description will be given below in detail of the structure of a rolling device such as a rolling bearing or the like according to the invention with reference to the accompanying drawings.

Figure 1:
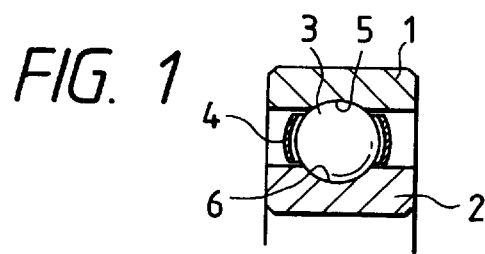
FIG. 1 is a partial section view of a single-line deep groove ball bearing which is a first embodiment of a rolling device according to the invention.

FIG. 1 is a partial section view of a single row deep groove ball bearing which is a first embodiment of a rolling device according to the invention. In the present ball bearing, between an outer race 1 serving as the outer member of the ball bearing and an inner race 2 serving as the inner member of the ball bearing, there are disposed a plurality of balls 3 serving as the rolling elements of the ball bearing, while the balls 3 are respectively held by pockets of a cage 4. In this case, the raceway surface 5 of the outer race 1 which is the contact surface of the outer race 1 with the balls 3 provides a first contact surface, while the raceway surface 6 of the inner race 2 which is the contact surface of the inner race 2 with the balls 3 provides a second contact surface.

In the above-mentioned first embodiment, as a rolling bearing, a single-line deep groove ball bearing of an open type is shown. However, the present invention can also be similarly applied to ball bearings of a sealed type, a rubber seal type and the like, as well as to other types of ball bearings. Further, besides the ball bearing, the invention can be applied to a roller bearing as well.

Figure 2:
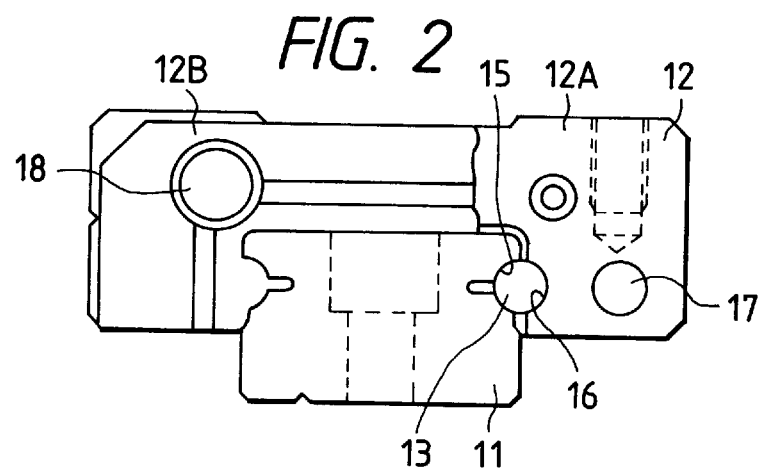
FIG. 2 is a partially cutaway front view of a small-type linear guide which is a second embodiment of a rolling device according to the invention.

Now, FIG. 2 is a partially cutaway front view of a small-type linear guide which is a second embodiment of a rolling device according to the invention. In the present linear guide, as an inner member of the linear guide, there is provided a guide rail 11 having a substantially square-shaped cross section, and a slider 12 having a U-shaped section and serving as the outer member of the linear guide is disposed such that it extends astride of the guide rail 11, while a large number of balls 13 serving as the rolling elements of the linear guide are interposed between the two inner and outer members. In detail, in the outer surface of the guide rail 11, there are formed a pair of raceway grooves 15 which are long in the axial direction of the guide rail 11. On the other hand, in the inner surface of a slider main body 12A which is a component part of the slider 12, there are formed a pair of raceway grooves 16 which are opposed to the raceway grooves 15. Also, in the sleeve portion of the slider 12, there are formed a pair of rolling member return paths 17 which consist of a through hole formed in parallel to the raceway groove 16. Two end caps 12B, which are the component parts of the slider 12, are respectively mounted on the two end portions of the slider main body 12A by screws 18. In these end caps 12B, there is formed a semi-doughnut-shaped curved path (not shown) which communicates the raceway groove 16 and the rolling element return path 17 with each other. In this manner, the raceway groove 16, rolling element return path 17 and curved path cooperate together in forming a circulation path for the rolling elements 13. That is, the above-mentioned large number of balls or rolling elements 13 are loaded into the circulation path in such a manner that they are prevented from slipping off. In this case, the first contact surface, which is the contact surface of the outer member 12 with respect to the rolling elements 13, is the raceway groove 16 formed in the inner surface of the slider 12, whereas the second contact surface, which is the contact surface of the inner member 11 with the rolling elements 13, is the raceway groove 15 formed in the outer surface of the guide rail 11.

Here, the linear guide of the invention is not limited to the linear guide of a type shown in FIG. 2 but it can be similarly applied to other types of linear guides: for example, a linear guide of a type that, on one side portion of the linear guide, there are formed the raceway grooves 16 in the inner surface of the slider 12 serving as the first contact surface and the raceway grooves 15 of the guide rail 11 serving as the second contact surface two or more each; a type that the rolling elements consist of rollers; and, a type that a guide rail has a U-shaped section and a slider is disposed in a recessed portion formed in the inner surface of the guide rail in such a manner that the slider can be moved freely through rolling elements.

Figure 3:
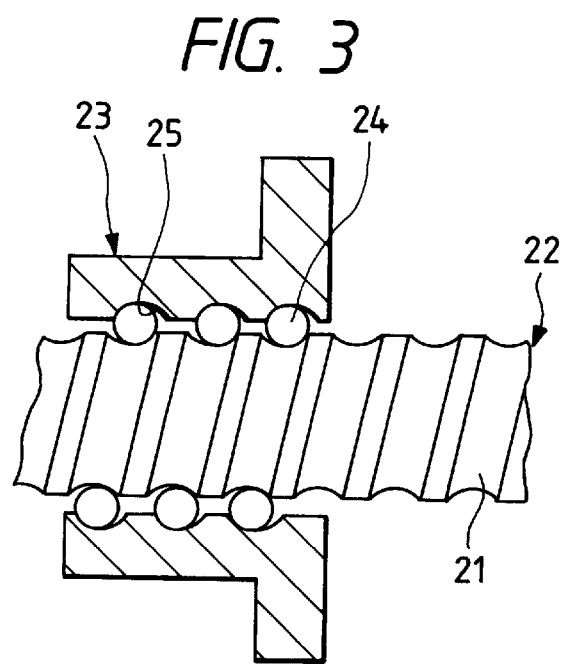
FIG. 3 is a section view of the main portions of a ball screw which is a third embodiment of a rolling device according to the invention.

Now, FIG. 3 is a section view of the main portions of a ball screw which is a third embodiment of a rolling device according to the invention. The present ball screw includes a screw shaft 22 which serves as the inner member of the ball screw and has a spirally-shaped screw groove 21 formed on the outer peripheral surface thereof. In the present ball screw, a nut 23 serving as the outer member of the ball screw is in threaded engagement with the screw shaft 22 through rolling elements 24 which consist of a large number of balls. The nut 23 includes in the inner peripheral surface thereof a screw groove 25 which corresponds to the screw groove 21 of the screw shaft 22. While rolling in the rotation direction of the screw shaft 22 along a spirally-shaped space formed by the two screw grooves 21 and 25, the rolling elements 24 circulate between the two axial ends of the nut 23 under the guidance of a ball circulation path (not shown) such as a circulation bridge formed in the body of the nut 23. Also, the present ball screw is structured such that, it the screw shaft 22 is rotated, then the nut 23 can be moved in a linear direction along the screw shaft 22 by means of the rolling movements of the rolling elements 24.

In the third embodiment, the first contact surface, which is the contact surface of the outer member 23 with the rolling elements 24, is the screw groove 25 of the nut 23, while the second contact surface, which is the contact surface of the inner member 22 with the rolling elements 24, is the screw groove 21 formed in the outer surface of the screw shaft 22.

Here, as the ball screw of the invention, the invention is not limited to the ball screw of a type shown in FIG. 3 but the invention can also be applied similarly to other types of ball screws, such as a tube circulation type using a tube as the rolling element, an end cap circulation type that a circulation path is formed in end caps, and the like.

Next, description will be given below of the action of alloy components respectively used to form a rolling bearing or other rolling device according to the invention as well as reasons why the range of the alloy components is limited.

[C]

C is an element which is used to transform the base material of the bearing into martensite to thereby improve the hardness of the base material after it is hardened and tempered, to thereby increase the strength of the bearing. However, from the viewpoint of the corrosion resistance of the bearing, the amount of C decreases as the corrosion resistance of the bearing becomes better. If a large amount of C is added to the base material, then Cr forms large-size eutectic carbides when steel is produced. As a result, the base material lacks for the concentration of Cr to be contained therein, which not only makes it impossible to provide sufficient corrosion resistance but also lowers the rolling life and toughness of the bearing. For this reason the content of carbon C is set to be less than 0.6 wt %. However, from the viewpoint of the corrosion resistance, the content of carbon may be preferably less than 0.5 wt % and, more preferably, less than 0.45 wt %.

[Cr]

Cr is the most important element to provide steel with corrosion resistance but, if the content of Cr is less than 10.0 wt %, then good corrosion resistance cannot be provided. Also, although the corrosion resistance of the steel increases as the content of Cr increases, if Cr is added in an amount larger than necessary, then δ ferrite which embrittles the steel is generated to thereby lower the toughness of the steel. In view of this, the upper limit of the content of Cr is set for 22.0 wt %. In some cases, the concentration of Cr in the base material of the steel is increased excessively to thereby lower Ms (martensitic transformation starting temperature), so that a sufficient hardening hardness cannot be obtained. Therefore, preferably, the upper limit of the content of Cr may be 16 wt %. From the viewpoint of the corrosion resistance of the steel, the lower limit of the Cr content may be preferably 12.0 wt % or more.

Further, there is a possibility that a high carbon concentration can facilitate the formation of eutectic carbides. Therefore, more preferably, the upper limit of the Cr content may be 14 wt %. In particular, even if the steel is subzero treated, when retained austenite $\gamma_R$ is generated to thereby lower the hardening hardness of the steel due to the amount of N added and the amount of undissolved carbides, the Cr content may be set preferably in the range of 11.5 wt % to 13.5 wt % in consideration of the corrosion resistance of the steel.

Also, although Cr can increase the corrosion resistance of the stainless steel of rolling device greatly under the general corrosive environment such as the underwater environment, wet environment and the like, the reducing acids such as the sulfuric acid, hydrochloric acid and the like are acids which attack the passivated film of the stainless steel. In some cases, the Cr content of the stainless steel is increased as the stainless steel can be corroded more easily. Further, as the Cr content is increased, the thermal conductivity of the raw material is decreased, which results in a tendency to worsen the grindability of the raw material. This increases not only the cost of the raw material but also the manufacturing cost of the rolling device. Accordingly, in the cases the upper limit of the Cr content is preferable to be 13.5 wt %. For these reasons, the Cr content is set in the range of 10.0 wt % to 22 wt %. Preferably, it may be set in the range of 11.5 wt % to 13.5 wt %.

[Mn]

Mn is an element which is necessary as a deoxidizing agent when steel is manufactured. Mn of 0.1 wt % or more is added to the steel. If a large amount of Mn is added, then not only the forgeability and grindability of the steel are lowered but also the coexistence of such Mn with impurities such as S, P and the like lowers the corrosion resistance of the steel and, therefore, the upper limit of the Mn content is set for 1.5 wt %. Here, there is a possibility that the amount of retained austenite can increase to thereby make it impossible to obtain a sufficient hardening hardness. In view of this, preferably, the upper limit of the Mn content may be 0.8 wt %. Also, depending on the amount nitrogen added, the amount of retained austenite can be increased to a great extent to thereby make it impossible to provide a sufficient hardening hardness. With this taken into account, preferably, the upper limit of the Mn content may be 0.5 wt %.

[Si]

Si is an element which, similarly to Mn, is necessary as a deoxidizing agent when steel is manufactured. Si of 0.1 wt % or more is added to the steel. Further, Si is an element which is effective in enhancing the temper softening resistance of the steel to thereby improve the rolling fatigue strength of the bearing. However, if a large amount of Si is added, then the toughness of the steel is lowered. Therefore, the upper limit of the Si content is set for 2.0 wt %, preferably for 1.0 wt %. [S]

S acts with Mn or the like to form inclusions to thereby lower the fatigue strength of the steel and further to lower the corrosion resistance of the steel as well. For this reason, as an impurity to be contained in the steel, the content of S should be minimized as much as possible. That is, the content of S is limited to 0.030 wt % or less in consideration of its cost as well.

[P]

P is an element which is prone to segregate and lowers the fatigue strength as well as the corrosion resistance of the steel, similarly to S. Therefore, as an impurity to be contained in the steel, the content of P should be minimized as much as possible. That is, the content of P is limited to 0.030 wt % in consideration of the production cost as well.

[O]

O acts to form oxide inclusions to thereby lower the fatigue strength of the steel extremely and further to deteriorate the acoustic characteristic of the steel. Therefore, the content of O should be minimized as much as possible. That in, with the cost of the bearing taken into account, the content of O may be set for 100 ppm or less. For the longer life of the steel, the content of O may be limited preferably to 50 ppm or less.

[Mo]

Mo is capable of increasing the hardenability and temper softening resistance of the steel to a great extent. Mo also acts to improve the pore corrosion resistance of the steel. However, if a large amount of Mo is added, then it can lower the toughness, workability and the like of the steel. For this reason, the upper limit of the Mo content may be set for 3.0 wt %.

[V]

V is an element which acts strongly to produce carbides/nitrides, restricts the production of Cr carbides and nitride, and causes the secondary hardening of the steel in a tempering process to thereby increase the strength of the steel to a great extent. However, if a large amount of V is added, then the workability of the steel is worsened. For this reason, the upper limit of the V content should be set for 2.0 wt %.

[N]

N, similarly to C, is capable of increasing the strength of martensite to thereby improve the pore corrosion resistance of the steel. In order to restrict the formation of primary eutectic carbides which are large in size, 0.05 wt % of N is added to the steel, preferably, 0.08 wt % of N may be added. Also, generally, the elements of V, Mo, Cr, Mn and the like increase the solubility of nitrogen but, in a normal method for manufacturing steel under the atmospheric pressure, since the nitrogen solubility in molten steel is small, it is difficult to add nitrogen of 0.2 wt % or more in the composition range of the steel according to the present invention. To add 0.2 wt % or more of nitrogen, it is necessary to provide a production facility which can be operated under the high pressure nitrogen atmosphere.

However, such production facility is expensive in cost, which is unfavorable. Also, if a large amount of nitrogen is added under the atmospheric pressure, then air bubbles can be generated in a solidifying process to thereby cause a large number of pores to be formed in an ingot. Depending on the amount of nitrogen (0.2 wt % or more), a large amount of retained austenite may be produced to thereby lower the hardening hardness of the steel, which in turn causes the life of the bearing to vary. For this reason, the content of N is set for 0.05 wt % (preferably 0.08 wt %) or more, and may be preferably set for 0.15 wt % (more preferably 0.14 wt %) or less.

[Ni]

Ni is an element which can stabilize austenite strongly. Ni acts to restrict the generation of δ ferrite, enhance the toughness of the rolling device, and further enhance the corrosion resistance of the rolling device as well as the resistance to an acid. Therefore, Ni should be added in an amount of 0.05 wt % or more. Preferably, the Ni content is set for 0.5 wt % or more. However, if Ni is added in an amount larger than necessary, then a large amount of retained austenite can be generated so that a sufficient hardening hardness cannot be obtained. For this reason, the upper limit of the Ni content is set for 3.5 wt %. Particularly, in the case where the rolling device is used under an environment including a solution containing acids, it is more effective to add the certain content of Ni.

[Cu]

Cu, similarly to Ni, is an element which acts to stabilize the austenite to a slight extent, that is, to restrict the generation of δ ferrite. Also, Cu enhances the corrosion resistance of the rolling device as well as the resistance of the rolling device to an acid. Therefore, Cu should be added in an amount of 0.05 wt % or more. Preferably, the Cu content is set for 0.5 wt % or more. However, if a large amount of Cu is added, then, in a hot forging step which is necessary in a rolling device manufacturing process, there is a possibility that a heat crack can be generated in the rolling device. For this reason, the upper limit of the Cu content is set for 3.0 wt %. Particularly, in the case where the rolling device is used under an environment including a solution containing acids, it is more effective to add the certain content of Cu.

[Ni %+2.4 Mn %+0.3 Cu % ≦ 5.0]

Ni, Mn and Cu are all austenite stabilizing elements and each of them has an action to enlarge an austenite area and lower the Ms point to thereby make it difficult to cause martensitic transformation. However, if the Ni, Mn and Cu contents are too large, then the amount of retained austenite increases so that the rolling device is unable to obtain a sufficient hardness to withstand the rolling fatigue thereof. For this reason, the total contents of Ni, Mn and Cu are set in a range which satisfies the condition represented by an equation of Ni %+2.4 Mn %+0.3 Cu % ≦ 5.0.

Here, according to the invention, nitrogen is substituted for carbon. One of the reasons for this substitution is as follows: when steel is tempered at high temperatures (400–600° C.) and is then deposited and hardened secondarily, in martensitic stainless steel (for example, G, H steel) which is formed of only carbides, for example, in minute metallic carbides referred to as $M_{23}C_6$, one atom of carbon in deprived of the steel base material, whereas about four atoms of metal M (this ratio applies similarly in Cr, Mo, V and the like) are deprived of the steel base material, that is, an atom ratio of carbon C to metal M is 1 to approx. 4. On the contrary, in the present invention, since part of carbon is replaced by nitrogen before the steel is transformed into a solid solution, the resultant (carbon) nitrides are CrN, $Cr_2N$ (this applies similarly in V and Mo as well), so that an atom ratio of nitrogen N to metal Cr is 1 to 2. That is, the amount of Cr, which is deprived of the base material of the bearing that is made of martensitic stainless steel consisting of only carbides, can be reduced to thereby improve the corrosion resistance of the bearing accordingly. In addition, the (carbon) nitrides are higher in corrosion resistance than the carbides only.

[C+N]

To obtain the surface hardness of $H_RC$ 58 or more by strengthening and hardening the martensite secondarily, it is necessary to add the C+N content of 0.45 wt % or more.

Also, depending on the concentration of carbon, nitrogen or Cr, a large amount of retained austenite can be produced to thereby make it impossible to obtain a sufficient hardening hardness. For this reason, the total content of C+N is preferably limited to 0.65% or less.

Within the above-mentioned component range, there is no possibility that large-size eutectic carbides can be generated or ferrite can be produced to thereby lower the toughness of the bearing.

[the eutectic carbides or nitrides (including carbon nitrides) contained in the steel being 20 μm or less in major diameter and the hardness being $H_RC$ 58 or more after being hardened, subzero treated and tempered]

Figure 5:
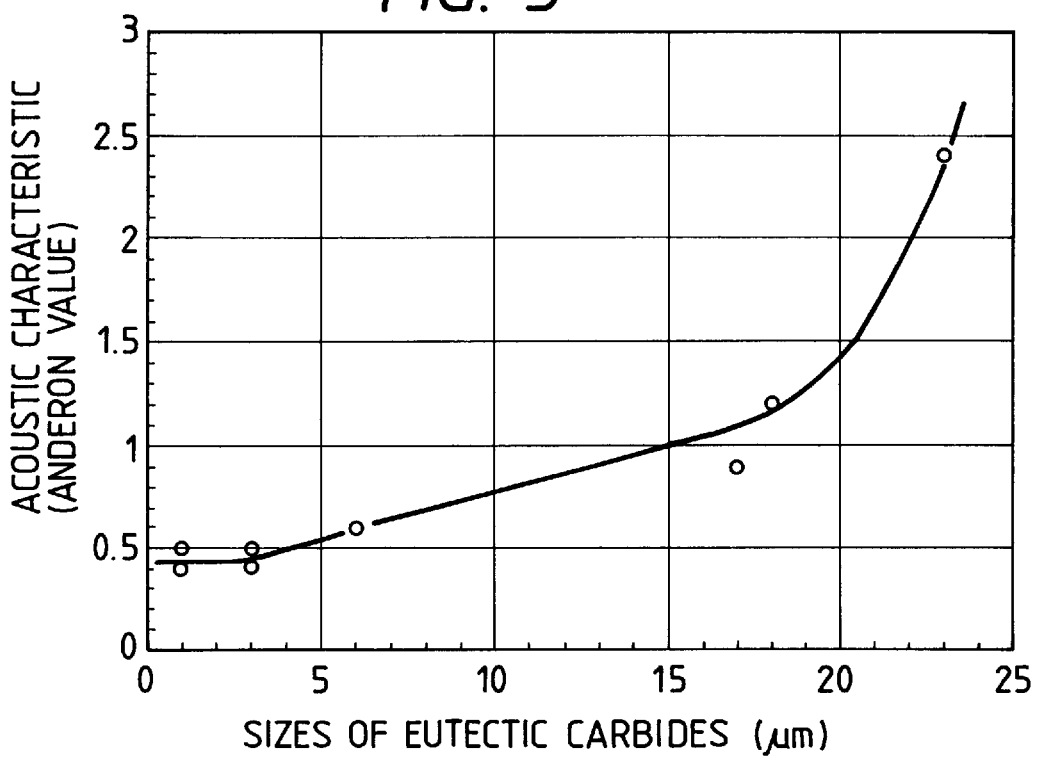
FIG. 5 is a graphical representation of a relationship between the sizes of eutectic carbides and the acoustic characteristic of steel.

If the eutectic carbides formed in a solidifying process when steel is manufactured are larger than 20 μm in major diameter, then it is difficult to attain an expected precision such as a surface roughness or the like which is a target in finish working the steel and also there is produced a difference in wear between the carbides and the steel base material during the rotational operation, which results in the lowered acoustic characteristic of the bearing (FIG. 5). To fulfil the effects of the existence of the eutectic carbides or nitride, the major diameter of them may be preferably less than 3 μm. Also, since the eutectic carbides or nitrides provide the source of centralized stresses, the fatigue strength, toughness and the like of the bearing are lowered by them and, besides, the Cr concentration in the steel base material becomes short due to the existence of the eutectic carbides or nitride, so that the corrosion resistance of the bearing is lowered. According to the invention, since the steel used to form at least one of the inner race, outer race and rolling elements of the rolling bearing is reduced in the content of carbon but contains nitrogen substituted for the reduced carbon, the resultant eutectic carbides are prevented from being large in size or no eutectic carbides are formed, but fine secondary carbides or nitrides are deposited to thereby increase the strength of the rolling bearing.

Also, even if the eutectic carbides or nitrides (including carbon nitrides) contained in the bearing are 20 μm or less in major diameter, unless the present steel has the hardness of $H_RC$ 58 or more after it is hardened, subzero treated and tempered, a sufficient fatigue strength cannot be obtained.

Now, there is a case in which the rolling bearing produced by satisfying the above-mentioned conditions, that is, the rolling bearing having good acoustic characteristic, fatigue strength, corrosion resistance, wear resistance and the like is used under a relatively high temperature environment. The conditions required for this case and the critical means thereof are as follows:

[the eutectic carbides or nitrides (including carbon nitrides) contained in the bearing being 20 μm or less in major diameter and the hardness of the present steel being $H_RC$ 58 or more after being hardened, subzero treated and then tampered at temperatures of 400° C. to 600° C.]

The reason why the eutectic carbides or nitrides (including carbon nitrides) contained in the bearing are 20 µm or less in major diameter is similar to the above-mentioned case. However, when the bearing is used at a relatively high temperature, the bearing is tempered at a higher temperature than the temperature at which the bearing is used, with the dimensional stability taken into consideration. In the conventional stainless steel, an the tempering temperature rises, the steel is gradually softened, so that the fatigue strength of the bearing is lowered and the wear resistance of the bearing is also deteriorated. On the other hand, the steel used for the rolling bearing according to the invention contains N, Mo, V or the like as an element which can act on the secondary hardening of the steel. Therefore, if the tempering temperature is in the range of 400° C. to 600° C., then fine nitrides (carbon nitrides) are deposited to thereby maintain the hardness of $H_RC$ 58 or more, so that high wear resistance can be obtained. To obtain the more preferable hardness of $H_RC$ 60 or more, it is preferable that the tempering temperature may be set in the range of 450° C. to 525° C.

Further, the reason for the fact that the eutectic carbides and other undissolved carbides are not present, or, if any, the size of the carbides is 2 µm or less and the area fraction of the carbides is 5% or less is as follows:

If large-size carbides exist in the base material of the rolling bearing, then the area of the base material where they exits and its neighboring area are short of Cr so that such areas are easy to corrode locally. Especially, the eutectic carbides that are generated in a solidifying process when the steel is manufactured are apt to become large in size, they are hard to melt into the steel base material in a heat treatment to be carried out later, and they are tremendously harmful to the corrosion resistance of the steel. Also, if the size, that is, the major diameter of the eutectic carbides exceeds 5 µm, then they have an undesirable influence on the fatigue strength of the steel as well. Therefore, the existence of the eutectic carbides is not desirable. Further, even when such eutectic carbides are not present, the undissolved carbides that are deposited secondarily are still present. At any rate, if the size of the eutectic carbides and the other undissolved carbides exceeds 2 µm, then the local corrosion resistance of the steel is lowered tremendously. Therefore, the size of the eutectic carbides or nitrides may be limited to 2 µm or less, preferably, 1.5 µm or less.

Also, even when the carbides are minute in size, if the amount of the carbides exceeds 5% by area fraction, then the passivation characteristic of the steel is lowered greatly and, therefore, the amount of the carbides may be limited to 5% or less, preferably, 3% or less.

[Retained austenite $\gamma_R$]

The acoustic characteristic of the steel is greatly influenced by the sizes of the eutectic carbides. On the other hand, if a large quantity of retained austenite $\gamma_R$ are presents the precision of the steel is deteriorated by impact loads or by the decomposition of the retained austenite $\gamma_R$, so that the acoustic characteristic of the steel is worsened. Especially, in the case of a bearing to be used in the field where the acoustic characteristic of the bearing is very important, if the retained austenite $\gamma_R$ is limited to 6 vol % or less, then the impact resistance of the bearing is enhanced outstandingly to thereby prevent the acoustic characteristic of the bearing from being deteriorated. To fulfil such preventive effect sufficiently, preferably, the retained austenite $\gamma_R$ may be limited to 4 vol % or less.

[Rolling elements; ceramics material]

By using ceramics material for the rolling elements of the bearing or f or one of the inner and outer races of the bearing, not only the wear of the bearing due to poor lubrication can be reduced but also the bearing can be used at high speeds. Also, since the ceramics material is much better in corrosion resistance than metal material as well as it is an insulator, use of the ceramics material can restrict the galvanic corrosion that is caused by contact between different kinds of metal. However, from the viewpoint of strength and cost, it is not desirable to use the ceramics for the inner and outer races of the bearing. Therefore, the ceramics material can be used only for the rolling elements of the bearing. However, when the ceramics is used for the rolling elements, because the ceramics is little deformed elastically, the inner and outer races receive higher contact pressures from the ceramic rolling elements than when the metal material is used for the rolling elements. If such large-size eutectic carbides as found in SUS440 are present in the races of the bearing, when the bearing is used under a poor lubrication environment, especially in the water, stresses are concentrated in the large-size eutectic carbides, so that the large-size eutectic carbides area of the bearing will flake off due to the surface fatigue.

In the steel according to the invention, large-size carbides which provide a source of concentrated stresses are not present. Accordingly, even if the ceramics is used for the rolling elements of the bearing, the bearing can enjoy not only an excellent life but also excellent wear resistance and corrosion resistance. That is, the steel according to the invention is suitable for application to a rolling bearing which is used under a corrosive and poor lubrication environment, for example, in the water.

[relationship between the content of C and the contents of Cr and N]

When the content of Cr is high and the content of carbon is low, δ ferrite is generated and the toughness of the steel is worsened greatly. However, if nitrogen is added, it is possible to reduce the carbon concentration that causes the δ ferrite to be generated. That is, if the lower limit of the carbon concentration is set such that C %≦0.04 Cr %–0.83 N %–0.39, then the generation of the δ ferrite can be restricted.

Also, if the upper limit of the carbon concentration is not set to C %≦–0.05 Cr %+1.41, then large-size primary eutectic carbides of 20 µm or more are generated to thereby lower the acoustic characteristic and fatigue strength of the steel (FIG. 5).

In the conventional steel, generally, even if the upper limit of the carbon concentration is set to C %≦–0.05 Cr %+1.41, there is a possibility that the size of the primary autectic carbides can often be large, that is, can increase up to about 5 to 20 µm or more than 20 µm due to the solidifying speed and the like in the steel making. However, in the stainless steel to be used for a rolling bearing according to the invention, nitrogen which restricts an increase in the size of the eutectic carbides is contained in the steel. Therefore, only if C %≦–0.05 Cr %+1.41 is satisfied, then the sizes of the eutectic carbides are prevented from getting larger than 20 µm, or, no eutectic carbides can be generated at all but fine secondary carbides or nitrides are deposited. The strength of the stainless steel in the invention can increase.

Figure 4A:
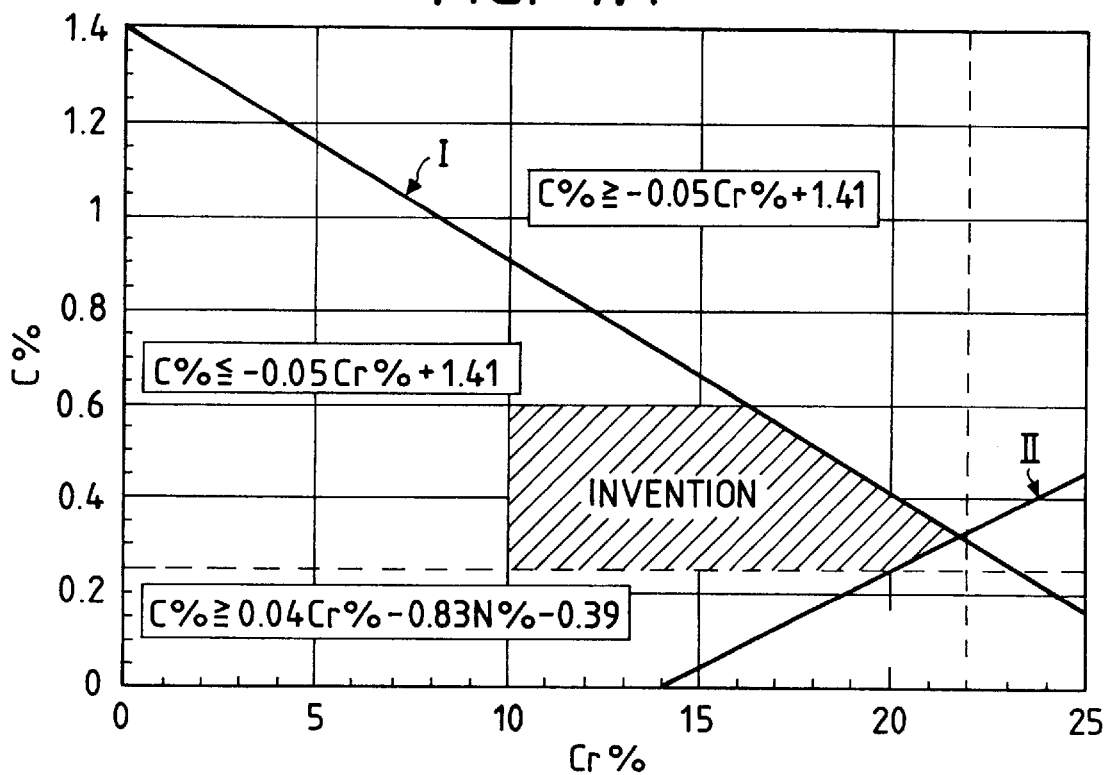
FIG. 4A is a graphical representation showing a specified range of the contents of C and Cr according to the invention.
Figure 4B:
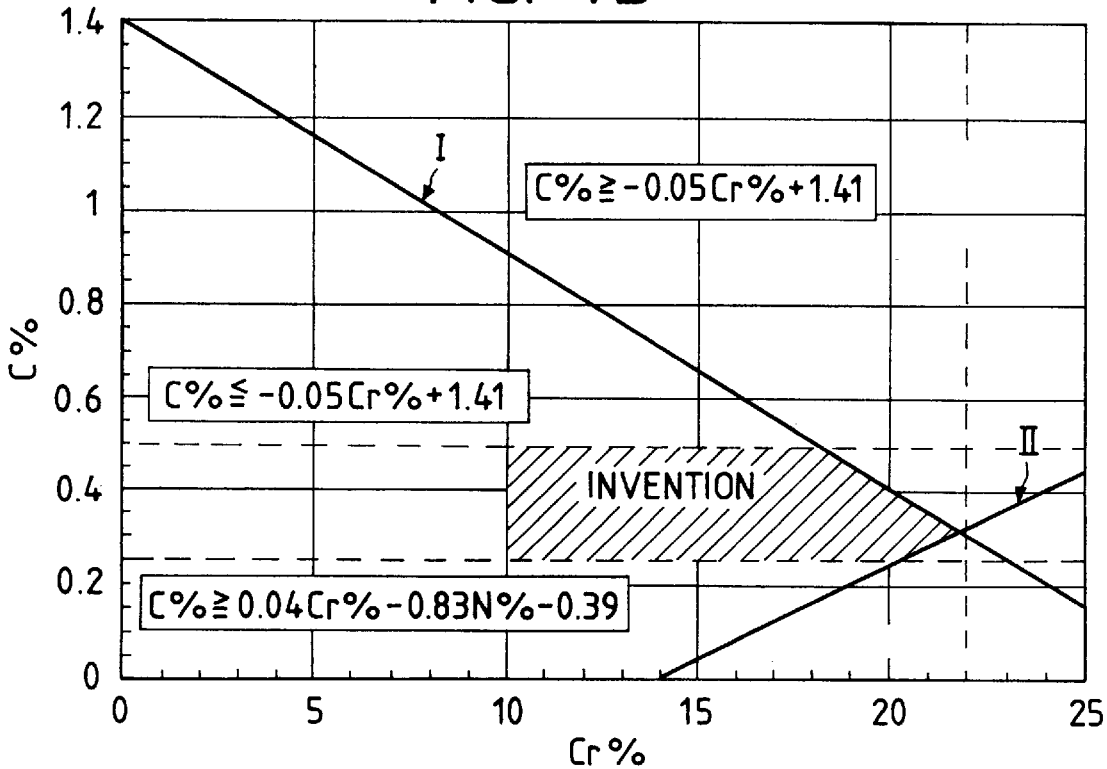
FIG. 4B is an explanatory view showing a preferred range of the invention in FIG. 4A.

Now, FIGS. 4A and 4B respectively show the ranges of the contents of carbon C and chromium Cr according to the invention. Especially, FIG. 4B shows a more preferred range in which the upper limit of the carbon content is set to 0.5 wt %. In either case, in addition to the previously described upper and lower limit values of the C and Cr contents, the contents of the elements are specified by relationship equations (shown in these figures) between C, Cr and N. That is, in FIGS. 4A and 4B, straight line I expresses C %=−0.05 Cr %+1.41; in the range above the straight line I, the eutectic carbides become large in size, whereas, in the range below the straight line, the size enlargement of the eutectic carbides is restricted. Also, in FIGS. 4A and 4B, straight line II shows a case of C %=0.04 Cr %−0.83 N %−0.39. Moreover, these figures are N=0.2 wt %. Since the range of N is from 0.05 wt % to less than 0.2 wt % according to the invention, the straight line II varies in this range depending on the content of N (that is, the straight line II is parallel displaced upwardly of the shown position as the content of N is lowered); in the range below the straight line II, δ ferrite is generated, whereas, on the straight line II and in the range above the straight line II, the generation δ ferrite is restricted.

To sum up the above description, the range of the allowable contents of C and Cr to be contained in at least one of the inner race, outer race and rolling elements of a rolling bearing according to the invention can be expressed by a net-pattern area shown in FIG. 4A (where N is set for the upper limit value thereof). Further, from the viewpoint of the corrosion resistance of the bearing, more preferably, the contents of C and Cr may be set in a range which is expressed by a net-pattern area shown in FIG. 4B.

Figure 9:
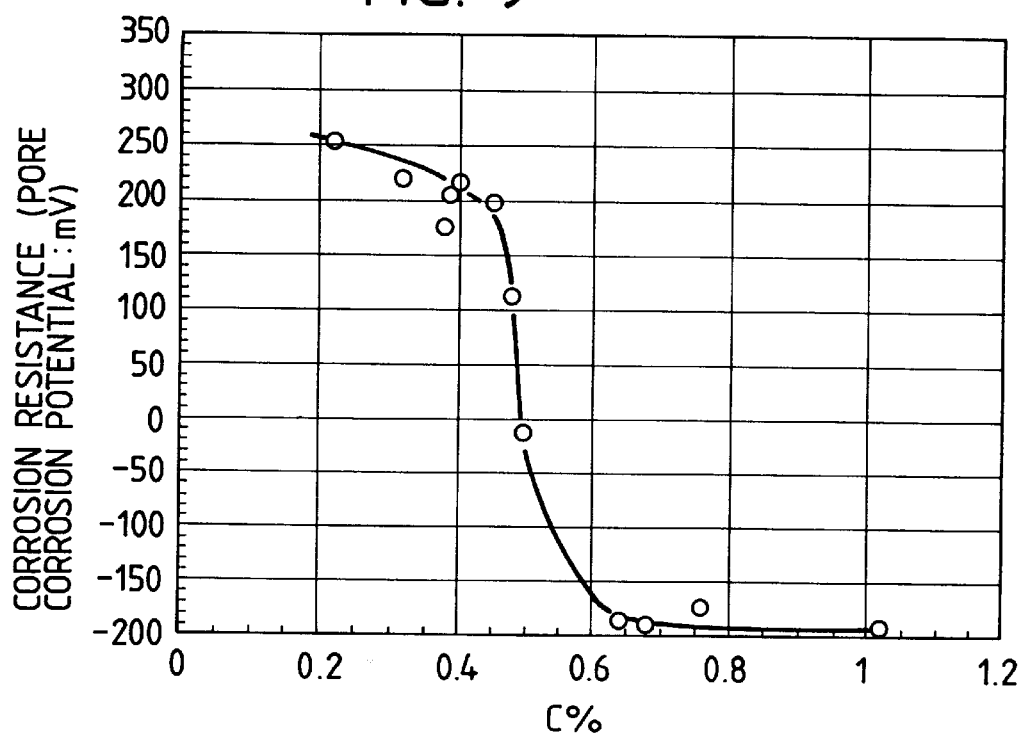
FIG. 9 is a graphical representation of a relationship between carbon concentration and corrosion resistance.

As for C, from the viewpoint of the corrosion resistance of the rolling bearing, as shown in FIG. 9, if it is set to less than 4.5 wt %, stabler and better corrosion resistance can be obtained.

EXAMPLES

Next, description will be given below of the examples of a rolling bearing or other rolling device according to the invention.

At first, Table 1 shows the seven alloy compositions of Steel Species A to G employed in a rolling bearing (A) according to the invention and the six alloy compositions of Steel Species H to M employed as a comparative example.

Also, referring to the heat treatment conditions of examples according to the present invention and comparative example, the heating temperature was set in the range of 1020–1080° C., next they were hardened in the hardening oil at a temperature of 60° C., immediately after such hardening, they were subzero treated for 1 hour at a temperature of −80° C., and they were tempered for two hours and at temperatures of 180° C. to 220° C., or they were tempered twice, each time for 2 hours and at temperatures of 480° C. to 520° C. In Table 1, because Steel Species K employed in the comparative example did not satisfy a condition 0.04 Cr %−0.83 N %−0.39≦C % and the generation of δ ferrite was confirmed, Steel Species K had not been evaluated since then.

Tables 2A to 2C show the results of the corrosion resistance evaluations that were made by the heat treatment quality tests, salt water spraying tests and pore corrosion potential measuring tests conducted on test pieces collected from the test samples of the respective steel species shown in Table 1, as well an the results of the evaluations of the acoustic characteristic, wear resistance, and fatigue strength.

TABLE 1

|  | Steel Species | C | Cr | Mn | Si | Mo | V | N |
|---|---|---|---|---|---|---|---|---|
| Examples | A | 0.38 | 12.30 | 0.64 | 0.60 | — | — | 0.07 |
|  | B | 0.40 | 15.45 | 0.55 | 0.50 | 1.06 | — | 0.17 |
|  | C | 0.45 | 15.10 | 0.58 | 0.48 | 0.48 | 1.01 | 0.19 |
|  | D | 0.32 | 12.90 | 0.56 | 0.42 | 0.97 | — | 0.16 |
|  | E | 0.39 | 14.95 | 0.52 | 0.57 | — | — | 0.11 |
|  | F | 0.48 | 14.89 | 0.53 | 0.48 | 0.54 | 0.52 | 0.18 |
|  | G | 0.50 | 15.86 | 0.55 | 0.45 | — | — | 0.12 |
| Comparative Examples | H | 0.64 | 12.60 | 0.59 | 0.36 | 0.04 | — | — |
|  | I | 1.02 | 17.12 | 0.59 | 0.36 | 0.40 | — | — |
|  | J | 0.22 | 14.83 | 0.57 | 0.41 | 0.27 | — | 0.17 |
|  | K | 0.22 | 19.83 | 0.57 | 0.41 | 0.87 | — | 0.18 |
|  | L | 0.68 | 14.93 | 0.54 | 0.38 | — | — | — |
|  | M | 0.76 | 15.82 | 0.52 | 0.53 | — | — | 0.10 |

TABLE 2A

|  | Test Pieces | Steel Species | Tempering (° C.) | Hardness $H_RC$ | Diameter of Eutectic Carbides (μm) |
|---|---|---|---|---|---|
| Examples | 1 | A | 180–220 | 58.6 | ≦3 |
|  | 2 | B | 180–220 | 60.1 | ≦3 |
|  | 3 | C | 180–220 | 59.8 | ≦3 |
|  | 4 | C | 480–520 | 61.2 | ≦3 |
|  | 5 | D | 180–220 | 59.2 | ≦3 |
|  | 6 | D | 480–520 | 60.7 | ≦3 |
|  | 7 | E | 180–220 | 59.8 | ≦3 |
|  | 8 | E | 480–520 | 60.1 | ≦3 |
|  | 9 | F | 180–220 | 59.4 | ≦3 |
|  | 10 | F | 480–520 | 60.9 | ≦3 |
|  | 11 | G | 180–220 | 59.6 | ≦3 |
|  | 12 | G | 480–520 | 60.4 | ≦3 |
| Comparative Examples | 13 | H | 180–220 | 58.2 | 6 |
|  | 14 | H | 480–520 | 55.4 | 6 |
|  | 15 | I | 180–220 | 59.7 | 23 |
|  | 16 | I | 480–520 | 56.8 | 23 |
|  | 17 | J | 180–220 | 56.4 | ≦3 |
|  | 18 | L | 180–220 | 58.7 | 18 |
|  | 19 | M | 180–220 | 59.5 | 17 |

TABLE 2B

|  | Test Pieces | $γ_R$ (%) | Pore Corrosion Potentials mV vs SCE | Salt Water Spray (after 50 hr) | Acoustic Tests | |
|---|---|---|---|---|---|---|
|  |  |  |  |  | Acoustic Characteristic | Acoustic Deterioration |
| Examples | 1 | 6 | 176 | ⊚ | 0.4 | 0.7 |
|  | 2 | 9 | 216 | ⊚ | 0.4 | 0.9 |
|  | 3 | 10 | 198 | ⊚ | 0.4 | 0.9 |
|  | 4 | ≦4 | 72 | ○ | 0.4 | 0.4 |
|  | 5 | 7 | 220 | ⊚ | 0.4 | 0.8 |
|  | 6 | ≦4 | 126 | ○ | 0.4 | 0.4 |
|  | 7 | 7 | 206 | ⊚ | 0.4 | 0.7 |
|  | 8 | ≦4 | 98 | ○ | 0.5 | 0.5 |
|  | 9 | 10 | 112 | ○ | 0.4 | 0.8 |
|  | 10 | ≦4 | 12 | Δ | 0.4 | 0.8 |
|  | 11 | 11 | −14 | Δ | 0.5 | 1.0 |
|  | 12 | ≦4 | −157 | x | 0.5 | 0.5 |
| Comparative Examples | 13 | 8 | −187 | x | 0.6 | 1.0 |
|  | 14 | ≦4 | −267 | x | 0.6 | 0.7 |
|  | 15 | 11 | −194 | x | 2.4 | 2.6 |
|  | 16 | ≦4 | −298 | x | 2.5 | 2.5 |
|  | 17 | 6 | 254 | ⊚ | 0.5 | 0.8 |
|  | 18 | 9 | −189 | x | 1.2 | 1.7 |
|  | 19 | 12 | −175 | x | 0.9 | 1.6 |

TABLE 2C

|  | Test Pieces | Wear Ratios (x10⁻⁵ g/m) | Lives (x10⁷ cycles) |
|---|---|---|---|
| Examples | 1 | 0.68 | 9.7 |
|  | 2 | 0.56 | 10.1 |
|  | 3 | 0.52 | 11.4 |
|  | 4 | 0.18 | 10.7 |
|  | 5 | 0.57 | 11.2 |
|  | 6 | 0.20 | 10.8 |
|  | 7 | 0.60 | 10.3 |
|  | 8 | 0.22 | 12.6 |
|  | 9 | 0.55 | 11.5 |
|  | 10 | 0.19 | 11.5 |
|  | 11 | 0.62 | 10.4 |
|  | 12 | 0.21 | 11.2 |
| Comparative Examples | 13 | 0.68 | 7.6 |
|  | 14 | 1.12 | 1.9 |
|  | 15 | 0.49 | 1.7 |
|  | 16 | 0.87 | 1.1 |
|  | 17 | 0.95 | 5.2 |
|  | 18 | 0.60 | 5.4 |
|  | 19 | 0.50 | 6.3 |

Figure 6:
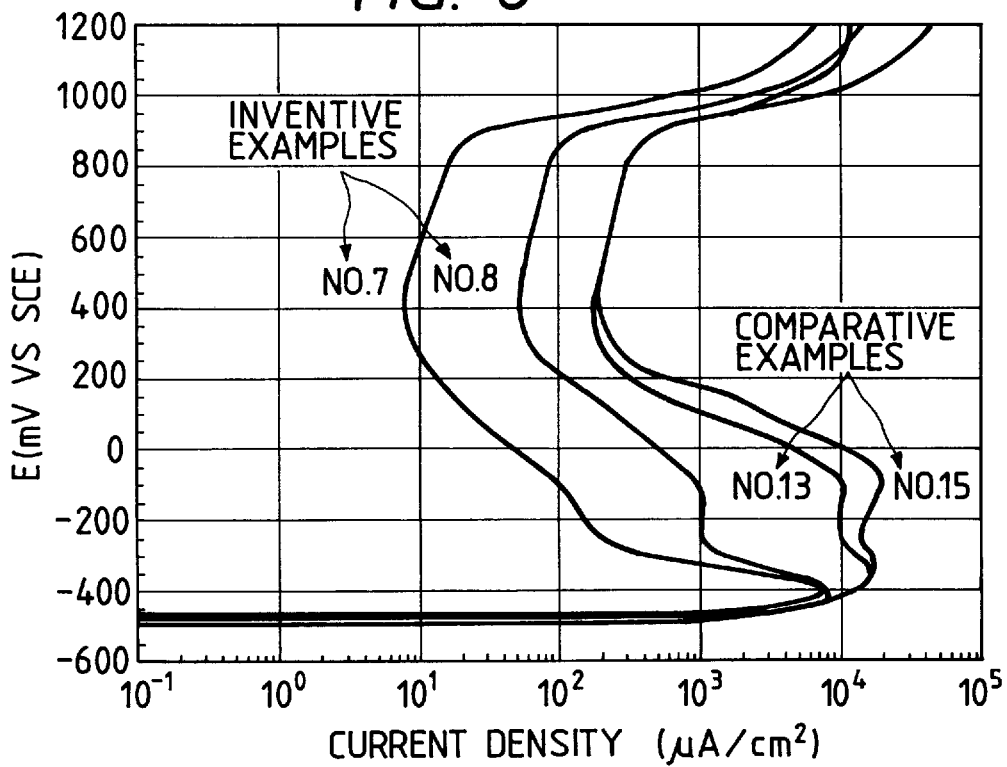
FIG. 6 is a graphical representation of the results of the anode polarization curves measurements of stainless steel.

Further, FIG. 6 shows the results of the anode polarization curve measuring test conducted on the examples of the invention and the comparative examples. The salt spray test was conducted in accordance with JIS (Japanese Industrial Standards) Z2371, in which a 5% solution of NaCl as the salt water was sprayed on the test pieces at a temperature of 35° C. and the outer appearances of the test pieces were checked after the spray of the solution was performed for 50 hours. In Table 2B, ⊚ expresses the test pieces which did not gather rust at all, o expresses the test pieces which gathered slight rust, and x expresses the test pieces which gathered heavy rust, respectively.

Also, the pore corrosion potential measuring test was conducted in accordance the JIS G0577. At first, the test pieces, which had been polished by emery paper up to the No. 800 grade, were immersed in a 30% solution of $HNO_3$ at a temperature of 60° C. for one hour to be thereby passivation processed and, after then, the test pieces were swept in a 3.5% solution of NaCl at a temperature of 30° C. at a potential sweep speed of 20 mV/min. and the potentials of the respective test pieces were evaluated in terms of their respective measured values mVvsSCE obtained when the anode current density reached 100 $\mu A/cm^2$.

The anode polarization curve measurement test was conducted in accordance with the JIS G0579. At first, the test pieces, which had been polished by emery paper up to No. 1200 grade, were cathode processed in a 5% solution Of $H_2SO_4$ at a temperature of 30° C. and, after then, they were measured at a sweep speed of 20 mV/min. up to 1200 mVvsSCE.

Figure 7A:
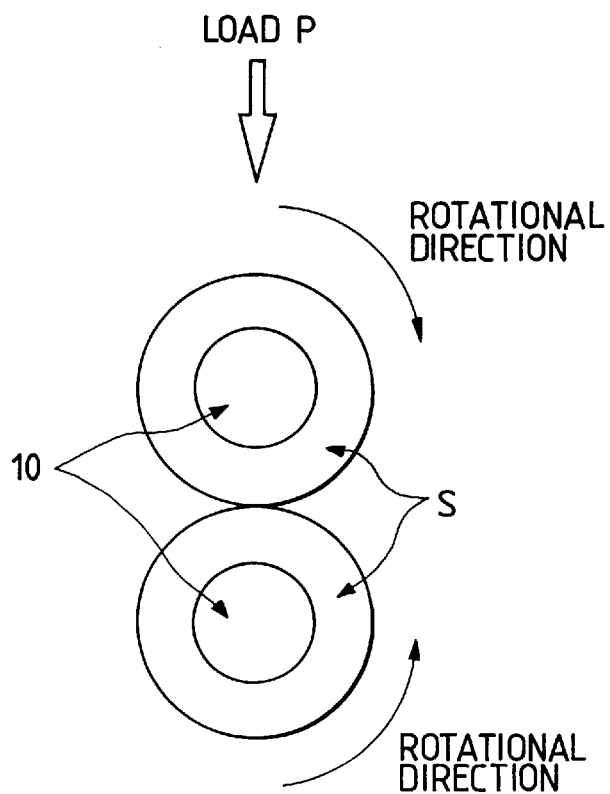
FIGS. 7A and 7B each is a typical view of the outline of a two-cylinder wear tester.
Figure 7B:
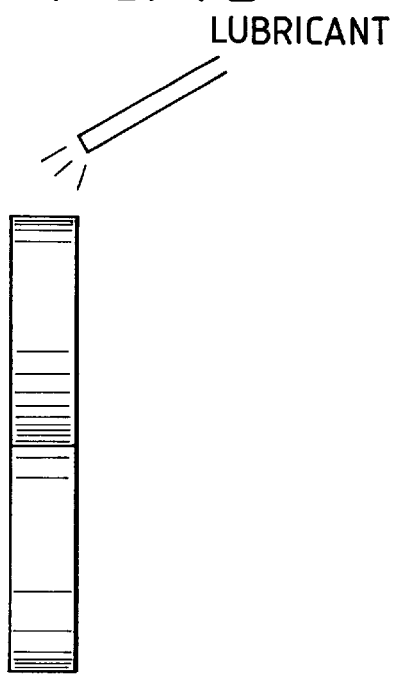

The wear test was conducted using a two-cylinder wear tester shown in FIGS. 7A and 7B under the following conditions. The present weak tester comprises a pair of cylinders 10 which are disposed opposed to each other in the vertical direction. That is, in the present wear tester, two test pieces S are respectively mounted on the pair of upper and lower cylinders 10, while applying a load P to them from above, they are rotated slowly in the mutually opposite directions in their mutual contact manner, thereby finding the average value of the wear rates (g/m) of the two test pieces S. Here, in the present evaluation, the partner test pieces are all formed of the same material.

| Load: | 50 kgf |
|---|---|
| Number of Revolutions: | 200 rpm |
| Slip Ratio: | 30% |
| Lubrication: | S10 |

Now, the life test was conducted using the Mori-system thrust rolling life tester under the following test conditions:

| Contact Pressure: | 4900 MPa |
|---|---|
| Number of Revolutions: | 1000 rpm |
| Lubrication: | Turbine oil No. 68 |

Figure 8:
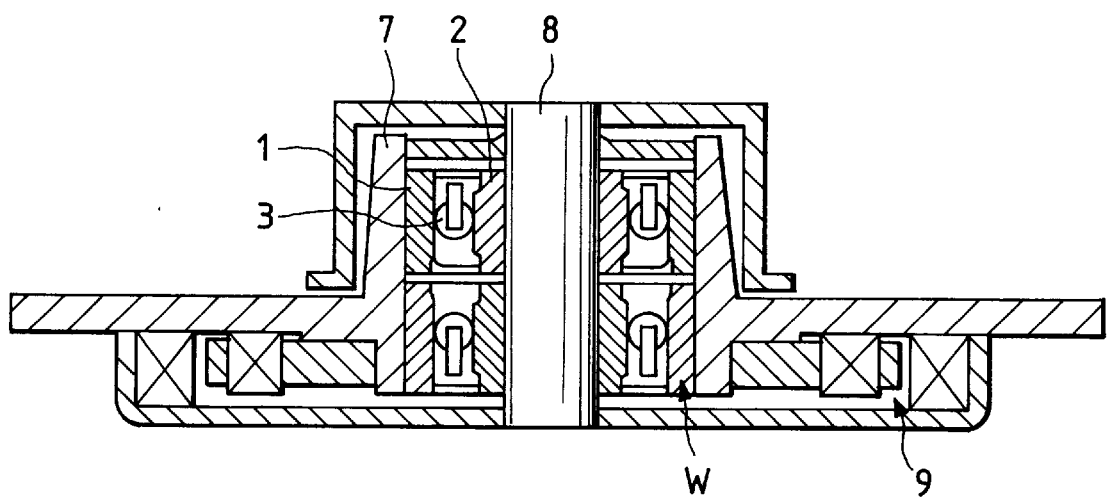
FIG. 8 is a section view of an embodiment of an acoustic characteristic measurement tester for testing the acoustic characteristic of a rolling bearing.

Now, the acoustic characteristics of the test pieces were evaluated in such a manner that rolling bearings (Designation No. 625) respectively formed of the steel species shown in Table 1 were used as test pieces, the test pieces, while applying a preload to each of them, were then assembled into such an HDD spindle motor as shown in FIG. 8, and they were rotated together, thereby measuring their respective initial anderon values (high band). In FIG. 8, a test piece or rolling bearing W, which includes an outer race 1, an inner race 2, and balls 3 respectively serving as rolling elements, is mounted on the HDD spindle motor in such a manner that the outer race 1 is fitted with a motor sleeve 5 and the inner race 2 is fitted with a motor shaft 6, respectively. The rotational drive force of the motor portion 7 of the spindle motor is used to rotate the motor shaft 6 through the rolling bearing W. In this case, the rolling bearing W is driven by the rotation of the inner race.

Also, in order to measure the degrees of the acoustic deterioration of the test pieces due to impact loads applied, the above-mentioned spindle motor was wholly dropped down to apply an impact load of 10 kg thereto, and, after then, a similar rotation test to the above-mentioned case was conducted, thereby measuring the initial anderon values (high bands) of the respective test pieces.

Figure 10:
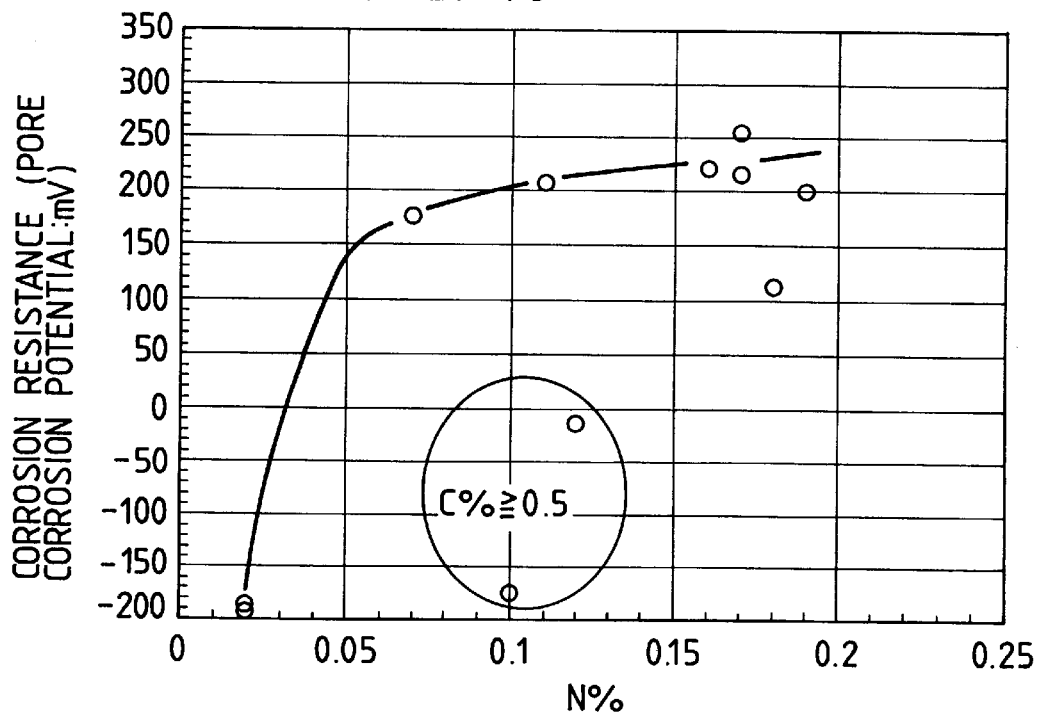
FIG. 10 is a graphical representation of nitrogen concentration and corrosion resistance.

In FIGS. 9 and 10, there are respectively shown a relationship between the concentration of nitrogen and corrosion resistance, and a relationship between the concentration of carbon and corrosion resistance. As can be seen clearly from FIG. 9, if the concentration of carbon in an alloy composition forming a rolling device increases, then the corrosion resistance of the bearing is gradually lowered. And, the carbon concentration becomes 0.6 wt % or more, then the generation of eutectic carbides is promoted and the corrosion resistance of the rolling device is worsened suddenly. On the other hand, it can be found clearly from FIG. 10 that if nitrogen of 0.05 wt % or more is contained in the alloy composition of the rolling device, then the corrosion resistance of the bearing can be enhanced tremendously due to a multiplier effect provided by such nitrogen addition and the lowered carbon content. However, even if nitrogen is added, the corrosion resistance of the bearing cannot be improved when the carbon content is 0.5 wt % or more. In a rolling bearing or other rolling device according to the invention, as shown in Table 1 (that is, Examples A to G), since the carbon concentration in the alloy components of the respective examples is less than 0.6 wt % and the nitrogen is added in the concentration range from 0.05 wt % to less than 0.2 wt %, especially, in Steel Species A to F (in Tables 2A to 2C, test pieces Nos. 1 to 10), the corrosion resistance is very good or good as shown in the results of the corrosion resistance evaluations by the pore corrosion potential measuring test and salt water spray test. However, referring to the test pieces Nos. 11 and 12, since the carbon content is 0.5 wt %, they have a good life but, when compared with the test pieces Nos. 1 to 10, they are slightly inferior in corrosion resistance. For this reason, when importance must be attached to the corrosion resistance, preferably, the carbon concentration may be less than 0.5 wt % (more preferably, less than 0.45%). The steel species in the comparative examples which contain no nitrogen (in Tables 2A to 2C, test pieces Nos. 13 to 16, and 18) show low corrosion resistance, respectively.

Also, the examples according to the invention respectively show good corrosion resistance even after they are tempered at high temperatures (in Tables 2A to 2C, the test pieces of Examples Nos. 4, 6, 8, and 10). On the other hand, the comparative examples (in Tables 2A to 2C, the test pieces of Comparative Examples Nos. 14 and 16) were found that they are lowered in the corrosion resistance after they are tempered at high temperatures and also that they gather rust heavily in the salt water spray test.

Figure 11:
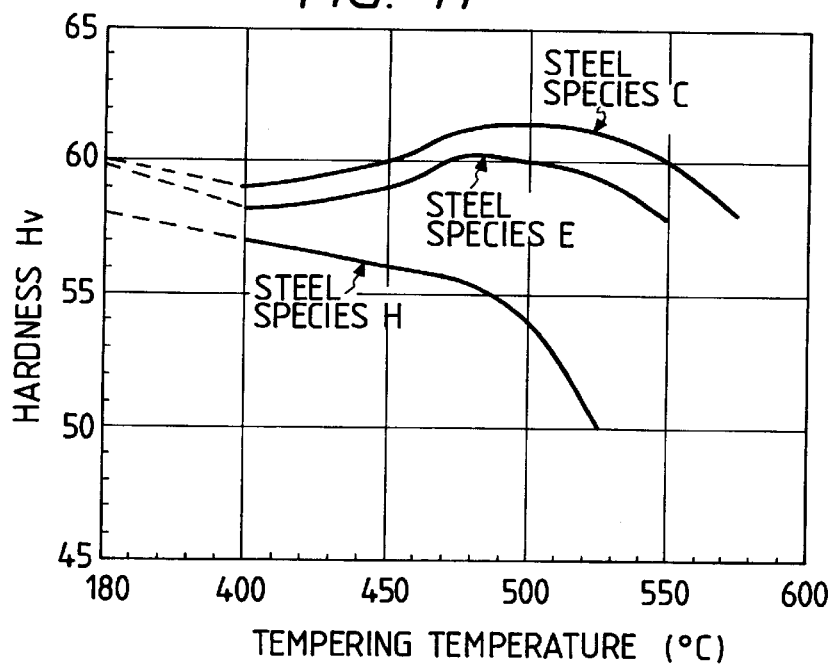
FIG. 11 is a graphical representation of a relationship between the tempering temperatures and hardness of the forming material of a rolling bearing.

Now, FIG. 11 is a graphical representation which plots relationships between tempering temperatures and hardness in Steel Species C and E of the examples and Steel Species H of the comparative example. Steel Species H of the comparative example is gradually softened as the tempering temperatures rise. On the other hand, in Steel Species C and E according to the present invention, since they are hardened secondarily, even if they are tempered at a temperature of 500° C., they can still keep the hardness of $H_RC$ 58 or more.

Figure 12:
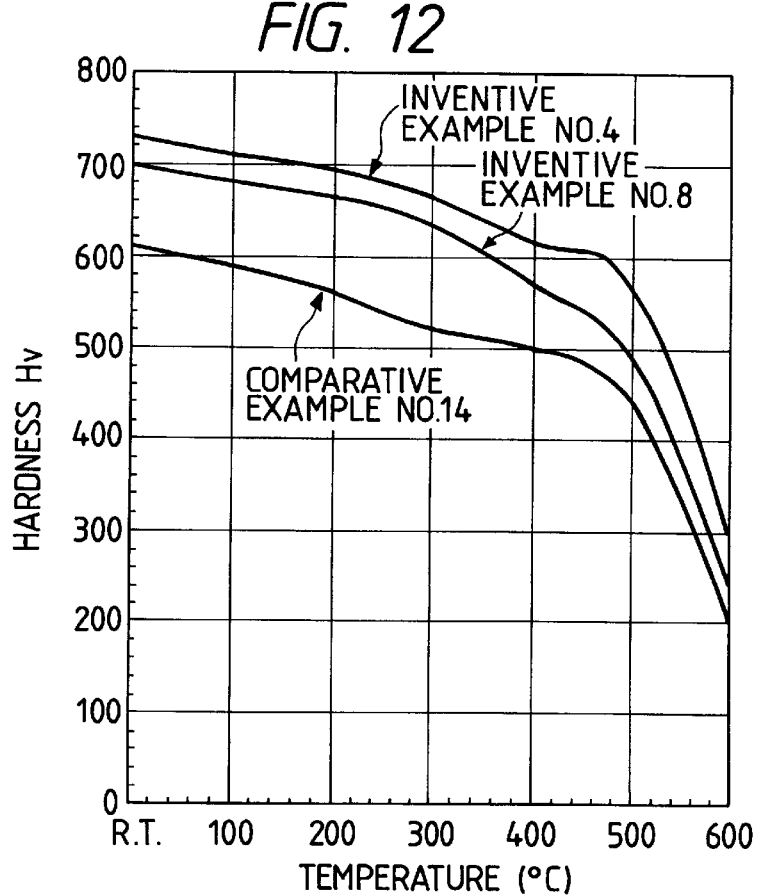
FIG. 12 is a graphical representation of a relationship between the temperatures and hardness at high temperatures of the forming material of a rolling bearing.

Further, as can be seen clearly from Tables 2A to 2C as well, in the test piece No. 8 according to the present invention, since hard and fine nitrides (carbon nitrides) are deposited due to the secondary hardening, the wear rate of the test piece No. 8 is 0.22 which is about ⅕. On the other hand, the wear rate of the test piece No. 14 of the comparative example that is 1.12, with the result that the wear resistance of the test piece No. 8 is far higher than that of the test piece No. 14. As shown in FIG. 12, in the test pieces Nos. 4 and 8 according to the present invention, since the above-mentioned nitrides are thermally stable, the hardness at a high temperature is also higher than that of the test piece No. 14 of the comparative example.

With regard to the acoustic characteristic, in the present invention, since the lower limit value of the carbon content satisfies C %≦−0.05 Cr %+1.42, few large-size eutectic carbides are generated. But, in most cases, fine carbides or nitrides (carbon nitrides) having a major diameter of 3 μm are generated, so that the test pieces according to the present invention are outstandingly excellent in the acoustic characteristics.

Figure 13:
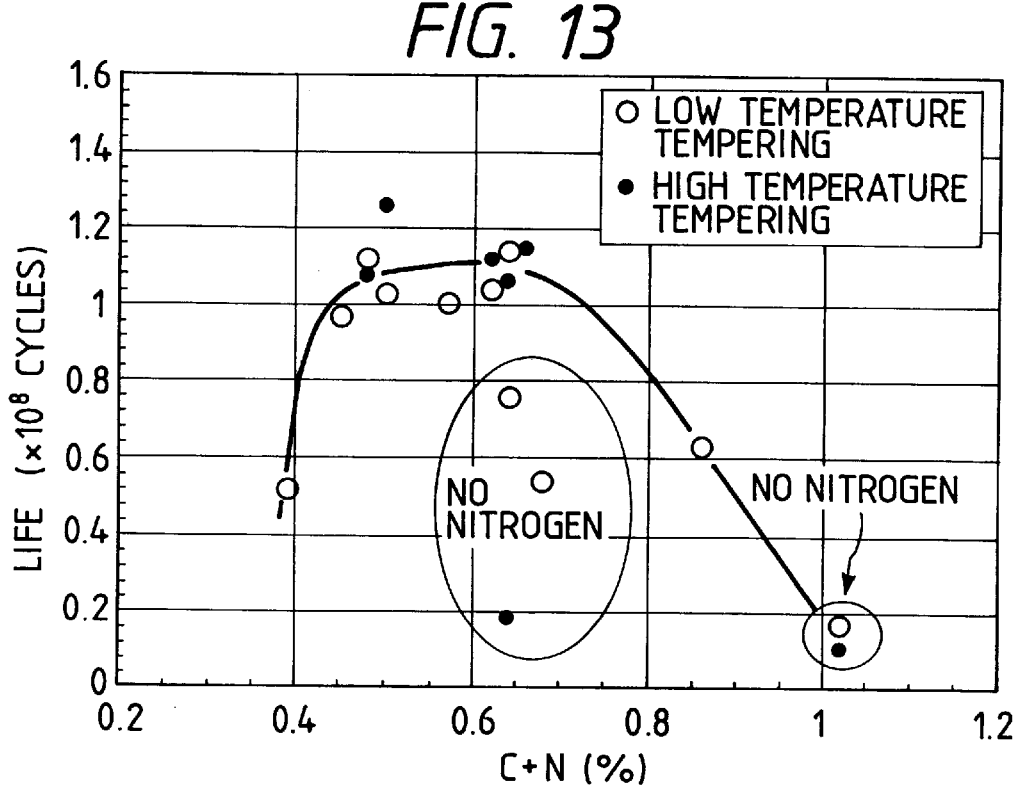
FIG. 13 is a graphical representation of a relationship between the total amounts of carbon and nitrogen contained in the forming material of a rolling bearing and the life of the rolling bearing.

Referring now to the lives of the test pieces, FIG. 13 shows a relationship between the sum of the carbon content and nitrogen content, namely, C+N, and the lives of the test pieces. If C+N is 0.45 wt % or less, the quantity of solution of the test piece is short. On the other hand, if C+N is more than 0.7 to 0.8 wt %, the eutectic carbides become large in size or the amount of the retained austenite is increased, which results in the lowered life of the test piece.

The evaluations of the individual test pieces of the comparative examples are as follows:

That is, the comparative test piece No. 13 satisfies C %≦−0.05 Cr %+1.41 but does not contain any nitrogen. Therefore, the eutectic carbides are rather larger in size than the test pieces according to the present invention, so that sufficient corrosion resistance cannot be obtained.

The comparative test piece No. 14, which is a case obtained when the same kind of steel as the comparative test piece No. 13 is tempered at a high temperature, is lowered in hardness, wear resistance and life as well as is deteriorated in corrosion resistance.

The comparative test piece No. 15, which is a conventional steel species of SUS440C, does not satisfy C %≦−0.05 Cr %+1.41. Therefore, large-size eutectic carbides are generated so that the fatigue strength is greatly lowered.

The comparative test piece No. 16, which is obtained by tempering the steel species of SUS440C at a high temperature, similarly to the comparative test piece No. 14, is lowered in hardness, wear resistance and life as well as is deteriorated in corrosion resistance.

The comparative test piece No. 17 contains nitrogen but is low in carbon concentration, while the total quantity of carbon and nitrogen is less than 0.45 wt %. Although the test piece No. 17 is high in corrosion resistance, a sufficient hardness cannot be obtained due to the shortage of the quantity of the solution of the carbon and nitrogen, which in turn results in the lowered fatigue strength.

Contrary to the above-mentioned evaluations of the comparative examples, the examples according to the present invention, as shown by the anode polarization curve in FIG. 6, show far better corrosion resistance than the comparative examples and, even the test pieces (that is, the test pieces No. 4, 6, 8 and 10), which are tempered at a high temperature, show excellent corrosion resistance.

Next, description will be given below of a rolling bearing (B) or other rolling device which is another embodiment according to the invention.

Table 3 shows the alloy compositions of Steel Species N to R, which are used in the present rolling bearing or other rolling device (B), and Steel Species S to V which are used in comparative examples.

Referring to the thermal treatment conditions of tests conducted on Steel Species N to V, they were heated at temperatures of 1000° C. to 1120° C., they were hardened in a hardening oil at a temperature of 60° C. and, just after this hardening, they were subzero treated for 20 minutes at a temperature of −190° C., and they were then tempered for 2 hours at temperatures of 160° C. to 220° C. or tempered twice each time for 2 hours at temperatures 480° C. to 520° C.

TABLE 3

| | Steel Species | C | Cr | Mn | Si | Mo | V | N | C + N |
|---|---|---|---|---|---|---|---|---|---|
| Examples | N | 0.33 | 12.30 | 0.32 | 0.50 | — | — | 0.12 | 0.45 |
| | O | 0.37 | 12.85 | 0.34 | 0.42 | 0.97 | — | 0.13 | 0.50 |
| | P | 0.40 | 12.50 | 0.41 | 0.48 | 0.48 | 0.82 | 0.14 | 0.54 |
| | Q | 0.44 | 12.12 | 0.28 | 0.42 | 0.97 | — | 0.13 | 0.57 |
| | R | 0.39 | 13.25 | 0.38 | 0.57 | — | — | 0.11 | 0.50 |
| Comparative | S | 0.45 | 15.18 | 0.55 | 0.50 | — | — | 0.17 | 0.62 |

TABLE 3-continued

| | Steel Species | C | Cr | Mn | Si | Mo | V | N | C + N |
|---|---|---|---|---|---|---|---|---|---|
| Examples | T | 0.39 | 14.95 | 0.52 | 0.57 | — | — | 0.13 | 0.52 |
| | U | 0.48 | 15.23 | 0.61 | 0.57 | — | — | 0.14 | 0.62 |
| | V | 0.69 | 13.24 | 0.57 | 0.39 | — | — | — | 0.69 |

Tables 4A to 4C show the thermal treatment qualities of the test pieces of the above-mentioned kinds of steel, the results of the corrosion evaluations by a salt water spray test and a pore corrosion potential measuring test, and the results of the acoustic tests and fatigue strength evaluations.

TABLE 4A

| | Test Pieces | Steel Species | Tempering (° C.) | Hardness $H_RC$ |
|---|---|---|---|---|
| Examples | B-1 | N | 160–220 | 61.1 |
| | B-2 | N | 160–220 | 61.3 |
| | B-3 | O | 160–220 | 61.3 |
| | B-4 | P | 160–220 | 62.5 |
| | B-5 | Q | 160–220 | 61.7 |
| | B-6 | R | 160–220 | 61.1 |
| | B-7 | O | 480–520 | 61.5 |
| | B-8 | P | 480–520 | 61.7 |
| | B-9 | R | 480–520 | 61.6 |
| Comparative | B-10 | S | 160–220 | 60.1 |
| Examples | B-11 | T | 160–220 | 60.3 |
| | B-12 | U | 160–220 | 61.4 |
| | B-13 | S | 160–220 | 56.4 |
| | B-14 | T | 160–220 | 56.7 |
| | B-15 | V | 160–220 | 58.8 |

TABLE 4B

| | Test Pieces | 5% Average Diameter of Undissolved Carbides ($\mu$m) | Area Fraction of Undissolved Carbides | $\gamma_R$ (%) |
|---|---|---|---|---|
| Examples | B-1 | 0.6 | 0.01 | 3 |
| | B-2 | 0.0 | 0.00 | 4 |
| | B-3 | 0.7 | 0.02 | 3 |
| | B-4 | 0.8 | 0.03 | 5 |
| | B-5 | 1.1 | 0.03 | 4 |
| | B-6 | 0.8 | 0.02 | 3 |
| | B-7 | — | — | 0 |
| | B-8 | — | — | 0 |
| | B-9 | — | — | 0 |
| Comparative | B-10 | 1.2 | 0.07 | 9 |
| Examples | B-11 | 0.8 | 0.06 | 7 |
| | B-12 | 2.1 | 0.05 | 10 |
| | B-13 | 0.8 | 0.02 | 39 |
| | B-14 | 0.8 | 0.02 | 33 |
| | B-15 | 3.4 | 0.07 | 9 |

TABLE 4C

| | Test Pieces | Pore Corrosion Potentials mV vs SCE | Salt Water Spray (after 50 hr) | Acoustic Tests (High Band) | Lives ($\times 10^7$ cycles) |
|---|---|---|---|---|---|
| Examples | B-1 | 286 | ⊚ | 0.3 | 11.5 |
| | B-2 | 293 | ⊚ | 0.3 | 9.7 |
| | B-3 | 298 | ⊚ | 0.3 | 12.4 |
| | B-4 | 280 | ⊚ | 0.3 | 11.8 |
| | B-5 | 276 | ⊚ | 0.3 | 10.2 |
| | B-6 | 288 | ⊚ | 0.3 | 12.6 |

TABLE 4C-continued

| | Test Pieces | Pore Corrosion Potentials mV vs SCE | Salt Water Spray (after 50 hr) | Acoustic Tests (High Band) | Lives ($\times 10^7$ cycles) |
|---|---|---|---|---|---|
| | B-7 | 195 | o | 0.3 | 11.7 |
| | B-8 | 196 | o | 0.3 | 10.9 |
| | B-9 | 202 | o | 0.3 | 12.3 |
| Comparative | B-10 | 141 | o | 0.4 | 10.1 |
| Examples | B-11 | 157 | o | 0.4 | 10.7 |
| | B-12 | 133 | o | 0.5 | 8.8 |
| | B-13 | 281 | ⊚ | 0.3 | 6.2 |
| | B-14 | 306 | ⊚ | 0.3 | 4.9 |
| | B-15 | −192 | x | 0.8 | 5.6 |

In Table 4B, values in column "Undissolved carbides, 5% average ($\mu$m)" were found in the following manner:

That is, a picture of a field of a scan-type electron microscope (for example, a microscope having a magnifying power of 3000) was taken, 100 pcs. of undissolved carbides found in the picture were sampled at random, the sampled undissolved carbides were image analysis processed to thereby find average particle sizes ½ (a+b) between the major diameters (a) and the minor diameters (b) of the undissolved carbides, the average particle sizes were arranged in a descending order, and the average particle size value of 5% of 100 pcs. of undissolved carbides, that is, 5 pcs. of undissolved carbides was obtained according to the following equation (1).

$$\sum_{i=1}^{n} \frac{1}{2}(a_i + b_i)/n \qquad (1)$$

Besides using the scan-type electron microscope in the above-mentioned manner, the average particle size can also be calculated automatically by an optical microscope image analyzer.

The salt water spray test, similarly to the previously described salt water spray test, was conducted in accordance with the JIS Z2371, that is, the outer appearances of the test pieces after the test time of 100 hours were checked. In Table 4C, mark ⊚ shows the test pieces that did not gather rust at all, o shows the test pieces that gathered slight rust, and x shows the test pieces that gathered heavy rust.

Also, the pore corrosion potential measurement test was made in accordance with the JIS G0577, while the anode polarization curve measurement test was made in accordance with the JIS G0579. Both measurement tests used the same methods as described above, respectively.

The acoustic test, quite similarly to the above-mentioned acoustic test, was conducted using the HDD spindle motor shown in FIG. 8.

The life test, similarly to the above-mentioned life test, was conducted using the Mori-system thrust rolling life tester under the same test conditions.

Figure 14:
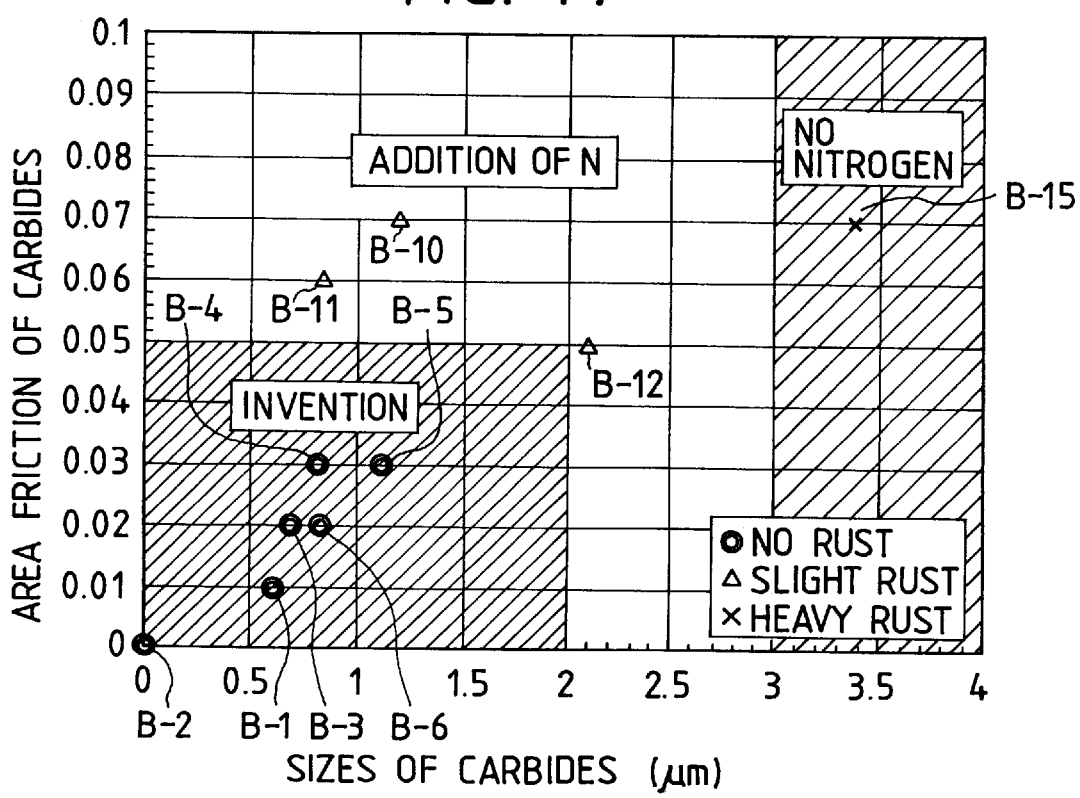
FIG. 14 is a graphical representation of another example according to the invention, showing a relationship between the sizes and area frictions of undissolved carbides and the evaluation results of a salt water spray test.

FIG. 14 shows a relationship between the sizes and area frictions of the undissolved carbides and the evaluation results of the salt water spray test. In the steel for use in the rolling bearing (B) according to the invention, since the sizes of the undissolved carbides are 2 μm or less and the quantity of the undissolved carbides are 5% or less by area fraction, the test pieces of the present steel show good corrosion resistance in the salt water spray test. On the other hand, in the test pieces of the comparative examples, because no nitrogen is contained or because the sizes of the undissolved carbides are 2 μm or more or the content of the undissolved carbides is 5% or more by area friction, the test pieces of the comparative examples are inferior in corrosion resistance to the test pieces according to the invention.

That is, it can be imagined that, if the large-size carbides, the segregated alloys and the like, at which the local corrosion starts, are reduced as much as possible to thereby obtain a uniform martensitic structure, then the alloy composition can fulfil its own original corrosion resistance. In the test pieces according to the present invention, the average particle size of the undissolved carbides is 2 μm or less and the area fraction of the carbides is 5% or less, so that all of the test pieces are found high in hardness and corrosion resistance as well as they are found excellent in acoustic characteristic and life. Further, even when they are tempered at a high temperature of about 500° C. in order to decompose the retained austenite, they can maintain the high corrosion resistance and, because they are hardened secondarily due to the effect of the nitrogen in the tempering process, it is also possible to restrict the reduction of the hardness which can be found in the conventional martensitic stainless steel.

In the comparative example Nos. B-10 to B-12, although nitrogen is added, the size or quantity of the undissolved carbides is large, so that they are slightly inferior in corrosion resistance to the steel test pieces according to the present invention.

In the comparative example Nos. B-13 and B-14 which are the test pieces that are hardened at higher temperatures than the test pieces Nos. 10 to 12, since the Cr and N contents are both large, the Ms point of the base material is lowered and a large amount of retained austenite is generated, with the result that the hardness and lives of the test pieces Nos. 13 and 14 are lowered.

In the comparative example No. B-15 which is formed of the conventional martensitic stainless steel, since no nitrogen is contained, it is very poor in corrosion resistance. Also, carbides generated therein are larger in size than those generated in the example in which nitrogen is added, that is, eutectic carbides having a major diameter as large as 23 μm are generated, which results in the deteriorated fatigue strength.

As described above, the rolling bearing or other rolling device (B) according to the invention is more excellent in life, acoustic characteristic and the like than the rolling bearing or other rolling device formed of the conventional martensitic stainless steel. In particular, the rolling bearing or other rolling device is improved in corrosion resistance than the conventional rolling bearing.

Next, description will be given below of the embodiments of a rolling bearing or other rolling device (C) and a rolling bearing or other rolling device (D) according to the invention.

In these embodiments, steel used to produce inner and outer races forming the rolling bearings as rolling devices is selected from the kinds of steel shown in Tables 1 to 4C which were used in the above-mentioned embodiments. On the other hand, as the material of the rolling elements of the rolling bearing, silicon nitrides of ceramics is used.

An underwater life test was conducted on examples according to the present invention and comparative examples having such combinations as shown in Table 5 to compare the performance or functions of the inventive examples with the performance of the comparative examples. In Table 5, reference numerals shown in the column of the test pieces Nos. of the inner and outer races correspond to the test pieces Nos. respectively shown in Tables 2A and 3, respectively.

Figure 15:
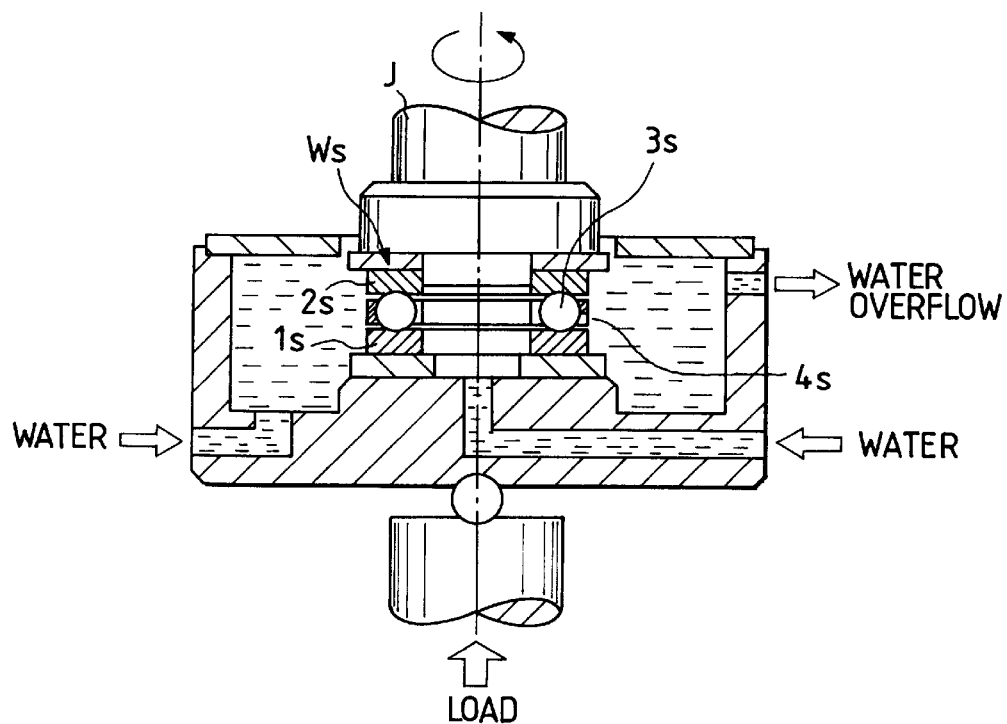
FIG. 15 is a section view of an underwater thrust life tester, explaining how to test a rolling bearing using the underwater thrust life tester.

The underwater life test was conducted using such an underwater thrust life tester as shown in FIG. 15 in such a manner that a thrust rolling bearing Ws was held in the water as a test piece, and running water was flowing over from the tester. In FIG. 15, the test piece of the rolling bearing Ws, which includes an outer race 1s, an inner race 2s, six balls 3s respectively serving as rolling elements, and a cage 4s, was tested in such a manner that the outer race 1s was fixedly supported, whereas the inner race 2s was rotated by a rotary shaft 8.

In the life judgment, a time when a vibration level detected by means of an acceleration pick-up method reached a value about five times an initial value was judged as the life of the bearing tested.

TABLE 5

| | Sample Nos. | Test Piece Nos. of Races | Balls | Lives ($\times 10^6$ cycles) |
|---|---|---|---|---|
| Examples | 1 | 2 | silicon nitride | 15.7 |
| | 2 | 3 | silicon nitride | 17.3 |
| | 3 | 4 | silicon nitride | 42.2 |
| | 4 | B-8 | silicon nitride | 37.4 |
| | 5 | B-6 | silicon nitride | 16.4 |
| | 6 | B-9 | silicon nitride | 35.6 |
| | 7 | 10 | silicon nitride | 37.6 |
| Comparative Examples | 8 | 2 | SUS440C | 0.87 |
| | 9 | 3 | SUS440C | 0.86 |
| | 10 | 4 | SUS440C | 2.47 |
| | 11 | B-8 | SUS440C | 1.81 |
| | 12 | B-6 | SUS440C | 0.64 |
| | 13 | B-9 | SUS440C | 1.68 |
| | 14 | 10 | SUS440C | 2.35 |
| | 15 | 13 | SUS440C | 0.83 |
| | 16 | 15 | SUS440C | 0.92 |
| | 17 | 18 | SUS440C | 0.86 |
| | 18 | 13 | silicon nitride | 3.2 |
| | 19 | 15 | silicon nitride | 2.8 |
| | 20 | 1B | silicon nitride | 2.6 |

The underwater thrust life test conditions are as follows:

| | |
|---|---|
| Load: | 150 kgf |
| Number of Revolutions: | 1000 rpm |
| Rolling Elements: | Silicon nitrides (in the case of a hybrid bearing) or SUS440C |
| Number of Rolling Elements: | 6 |
| Bearing Tested: | Thrust Ball Bearing No. 51305 |
| Cage: | Fluororesin |

Figure 16:
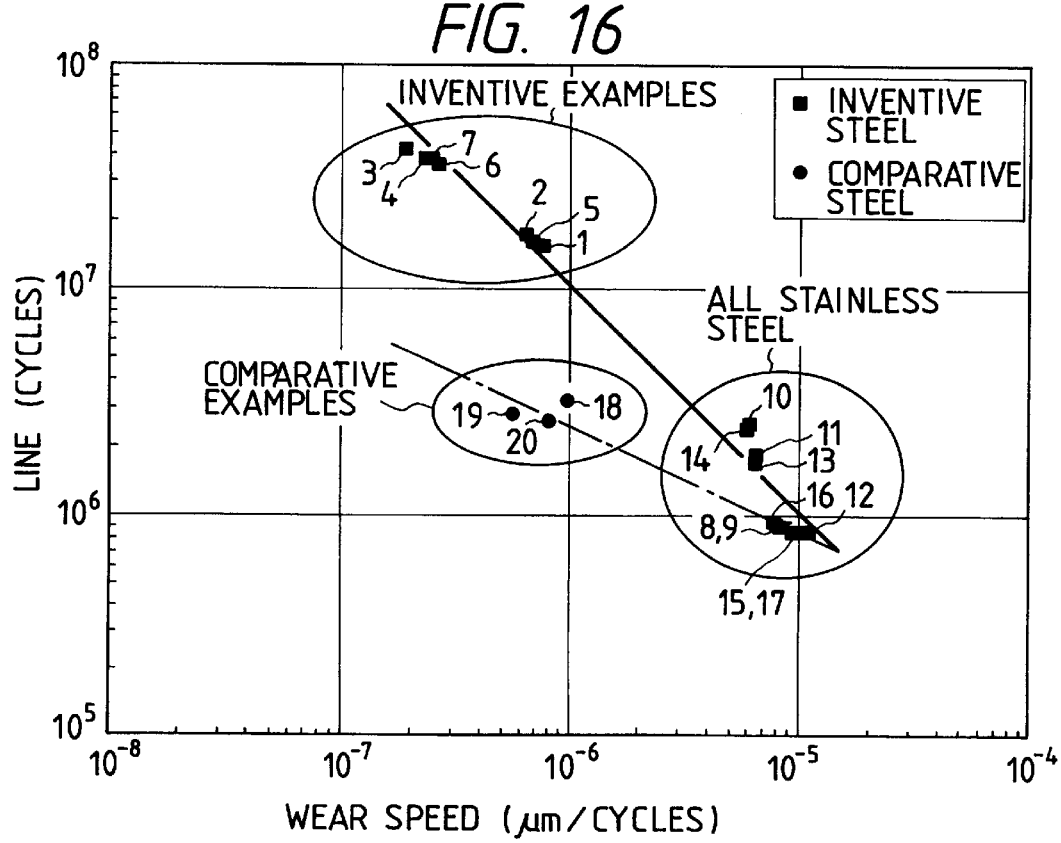
FIG. 16 is a graphical representation between wear speeds and lives of the examples according to the invention and comparative examples.

The results of the underwater thrust life test are shown in Table 5. Also, FIG. 16 shows a relationship between the wear speed and the life. In FIG. 16, the wear speed (abscissa) is the value that can be obtained in such a manner that the dimensional variation amounts of the six portions (nonflaked portions) of one of the inner and outer races are measured, the average value of these six measured amounts is obtained. While the thus obtained average value is assumed as the wear amount of the bearing to be tested, the average value is divided by the life time.

As can be seen clearly from Table 5 and FIG. 16, in the underwater life test, it is found that the bearings which are entirely formed of stainless steel including the inner and outer races and rolling elements are all short in life. This is because, as previously described, under a very severe lubrication condition such as in the water, the inner and outer races are directly contacted with the rolling elements to generate heavy wear between them. In particular, the test shows that the forms of breakage of the bearing were all caused by wear damage not by flaked damage. That is, the life of a bearing which is entirely formed of stainless steel depends strongly on the wear resistance. In the test, the bearings formed of the steel according to the invention which were tempered at a high temperature were found rather longer in life, whereas the other bearings formed of the steel according to the invention which were not tempered did not show any clear difference with respect to the comparative examples which were formed of conventional steel.

On the other hand, in a hybridized bearing according to the present invention in which the inner and outer races were formed of the stainless steel according to the invention and the rolling elements were formed of ceramics, it was confirmed that the wear of the bearing can be restricted to a great extent to thereby extend the life of the bearing very long. Especially, the respective examples according to the invention, in which the inner and outer races were formed of the test piece Nos. 4, B-8, B-9, and 10 respectively showing excellent wear resistance in the results of the two cylinder wear test, were found that they have a further longer life.

Among the similarly hybridized bearings, the bearings, in which the inner and outer races were formed of the comparative test pieces No. 13, No. 15, and No. 18, were found that they can reduce the wear thereof if ceramics was used in the rolling elements. However, because the breakage form of the bearings was changed from the wear damage form to the flaked damage form, they were not improved in life. This seems partly because the contact pressure to be applied to the outer and inner races is increased due to the hybridized structure, and partly because, when the inner and outer races are formed of the comparative test pieces No. 13, No. 15 and No. 18, large-size eutectic carbides having a major diameter of 5 μm or more are contained in the steel and these large-size eutectic carbides act as a stress concentration source.

From the above test results, in a rolling bearing which is used under a poor lubrication condition, especially under a poor lubrication/corrosive environment such as in the water, in order to avoid metal to metal contact, ceramics may be used for the rolling elements and, as for the material to be used for the outer and inner races, it is necessary to use stainless material which not only does not include such large-size carbides as acts as a stress concentration source but also is excellent in corrosion resistance and wear resistance.

In the above-mentioned description of the rolling devices (C) and (D) such as a rolling bearing or the like, as a typical example, a rolling bearing is used in which the rolling elements are formed of ceramics. However, the present invention is not limited to this but includes also a rolling device such as a linear guide, a ball screw or the like in which the rolling elements are formed of ceramics.

As described above, the rolling bearing and rolling device (C) and (D) according to the invention are excellent in corrosion resistance, wear resistance, life and the like as well as are able to fulfil their functions even under a corrosive environment, especially when they are used under a possible poor lubrication environment such as in the water.

Next, description will be given below of examples of a rolling bearing or other rolling device (E) according to the invention.

Table 6 shows the alloy compositions of Steel Species W, X, Y, Z, R, E, Q and P which are used in the rolling bearing (E) according to the invention, and Steel Species H, I, M, A', B' and C' which are used in comparative examples.

Steel Species R, E, Q and P shown as Example-2 in Table 6 contain the same alloy compositions as Steel Species identified with the same references in Tables 1 and 3. Although Ni and Cu are omitted in Steel Species R, E, Q and P shown in Tables 1 and 3, the alloy compositions including Ni and Cu are shown in Table 6. In addition, Steel Species H, I, and M shown as Comparative Example in Table 6 also contain the same alloy compositions as those identified with the same references in Table 1.

After test pieces respectively using the test samples of the respective steel species were heat treated under the following conditions, the inventors conducted a salt water spray test, a sulfuric acid and hydrochloric acid immersion test, and a lithium bromide solution immersion test on the test pieces. Referring to the heat treating conditions, a heating temperature was set in the range of 1000° C. to 1060° C., the test pieces were hardened in a hardening oil of a temperature of 60° C., just after this hardening, a subzero treatment was carried out on the hardened test pieces at a temperature of −80° C. and for one hour, and the test pieces were then tempered at temperatures of 160° C. to 220° C. and for 2 hours.

TABLE 6

|  | Steel Species | C | Cr | Mn | Si | Mo | V | Ni | Cu | N |
|---|---|---|---|---|---|---|---|---|---|---|
| Example-1 | W | 0.42 | 12.96 | 0.32 | 0.25 | — | — | 1.49 | 1.51 | 0.08 |
|  | X | 0.37 | 11.98 | 0.28 | 0.26 | — | — | 0.58 | 2.82 | 0.12 |
|  | Y | 0.35 | 13.25 | 0.30 | 0.35 | 0.98 | — | 0.99 | 0.98 | 0.14 |
|  | Z | 0.45 | 13.05 | 0.31 | 0.30 | 0.96 | 0.52 | 3.28 | 1.02 | 0.10 |
| Example-2 | R | 0.39 | 13.25 | 0.38 | 0.57 | — | — | 0.05 | 0.06 | 0.11 |
|  | E | 0.39 | 14.95 | 0.52 | 0.57 | — | — | 0.06 | 0.07 | 0.11 |
|  | Q | 0.44 | 12.12 | 0.28 | 0.42 | 0.97 | — | 0.05 | 0.07 | 0.13 |
|  | P | 0.40 | 12.50 | 0.41 | 0.48 | 0.48 | 0.82 | 0.05 | 0.07 | 0.14 |

TABLE 6-continued

|  | Steel Species | C | Cr | Mn | Si | Mo | V | Ni | Cu | N |
|---|---|---|---|---|---|---|---|---|---|---|
| Comparative Example | H | 0.64 | 12.60 | 0.59 | 0.36 | 0.04 | — | — | — | — |
| | I | 1.02 | 17.12 | 0.59 | 0.36 | 0.40 | — | — | — | — |
| | M | 0.76 | 15.82 | 0.52 | 0.53 | — | — | — | — | 0.10 |
| | A' | 0.44 | 13.15 | 0.45 | 0.37 | — | — | 3.68 | 0.49 | 0.14 |
| | B' | 0.43 | 13.08 | 0.43 | 0.35 | — | — | 1.02 | 3.26 | 0.13 |
| | C' | 0.42 | 13.02 | 0.59 | 0.38 | — | — | 3.17 | 1.99 | 0.13 |

Table 7 shows the heat treatment qualities of the respective test pieces, the results of the salt water spray test, the results of the sulfuric acid and hydrochloric acid immersion test, and the results of the lithium bromide solution immersion test.

TABLE 7A

| | Test Pieces | Steel Species | Hardness $H_RC$ | Diameter of Eutectic or Undissolved Carbides ($\mu$m) |
|---|---|---|---|---|
| Example-1 | C-1 | W | 60.0 | ≦3 |
| | C-2 | X | 60.5 | ≦3 |
| | C-3 | Y | 60.2 | ≦3 |
| | C-4 | Z | 59.8 | ≦3 |
| Example-2 | C-5 | R | 60.8 | ≦3 |
| | C-6 | E | 60.2 | ≦3 |
| | C-7 | Q | 61.3 | ≦3 |
| | C-8 | P | 62.2 | ≦3 |
| Comparative Example | 13 | H | 58.2 | 6 |
| | 15 | I | 59.7 | 23 |
| Comparative | 19 | M | 59.5 | 17 |
| | C-9 | A' | 57.1 | ≦3 |
| | C-10 | C' | 56.7 | ≦3 |

TABLE 7B

| | Test Pieces | Salt Water Spray (after 1 week) | Resistance to LiBr (after 1 week) |
|---|---|---|---|
| Example-1 | C-1 | ⊚ | ⊚ |
| | C-2 | ⊚ | ⊚ |
| | C-3 | ⊚ | ⊚ |
| | C-4 | ⊚ | ⊚ |
| Example-2 | C-5 | Δ | ○ |
| | C-6 | ○ | ○ |
| | C-7 | ○ | ○ |
| | C-8 | ○ | ○ |
| Comparative Example | 13 | x | x |
| | 15 | x | x |
| | 19 | x | x |
| | C-9 | ⊚ | ⊚ |
| | C-10 | ⊚ | ⊚ |

TABLE 7C

| | Test Pieces | Resistance to $H_2SO_4$ (g) 1N | 5N | Resistance to HCl (g) 1N | 5N |
|---|---|---|---|---|---|
| Example-1 | C-1 | 0.05 | 0.07 | 0.03 | 0.04 |
| | C-2 | 0.02 | 0.03 | 0.06 | 0.07 |
| | C-3 | 0.09 | 0.10 | 0.05 | 0.06 |
| | C-4 | 0.06 | 0.08 | 0.02 | 0.03 |
| Example-2 | C-5 | 0.98 | 2.02 | 0.24 | 0.36 |
| | C-6 | 0.65 | 1.24 | 0.59 | 0.98 |

TABLE 7C-continued

| | Test Pieces | Resistance to $H_2SO_4$ (g) 1N | 5N | Resistance to HCl (g) 1N | 5N |
|---|---|---|---|---|---|
| | C-7 | 0.68 | 0.96 | 0.26 | 0.42 |
| | C-8 | 0.62 | 0.89 | 0.22 | 0.38 |
| Comparative Example | 13 | 3.6 | 8.8 | 0.28 | 0.45 |
| | 15 | 2.2 | 4.3 | 0.53 | 0.83 |
| | 19 | 1.8 | 3.8 | 0.42 | 0.92 |
| | C-9 | 0.08 | 0.10 | 0.04 | 0.06 |
| | C-10 | 0.03 | 0.04 | 0.03 | 0.04 |

The salt water spray test, similarly to the test shown in Tables 2A to 2C, was conducted at a temperature of 35° C. using a 5% solution of NaCl, in accordance with the JIS Z2371. That is, after the passage of the test time of one week, the test pieces were evaluated by judging the outer appearances.

Figure 17:
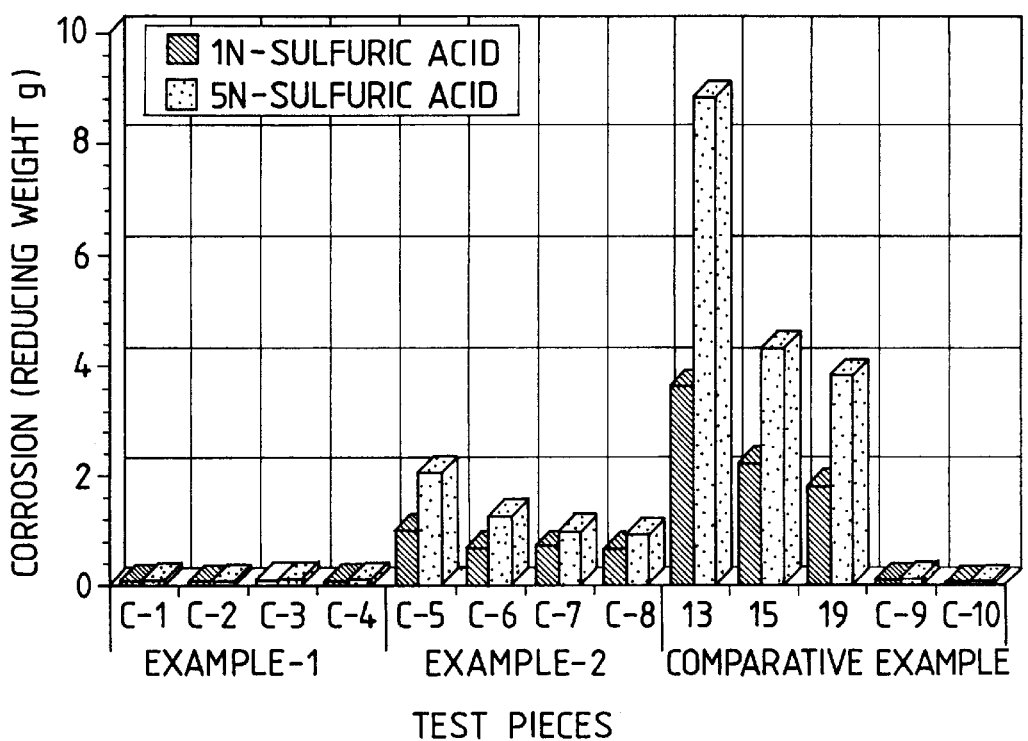
FIG. 17 shows the results of the sulfuric acid immersion test for each test piece.
Figure 18:
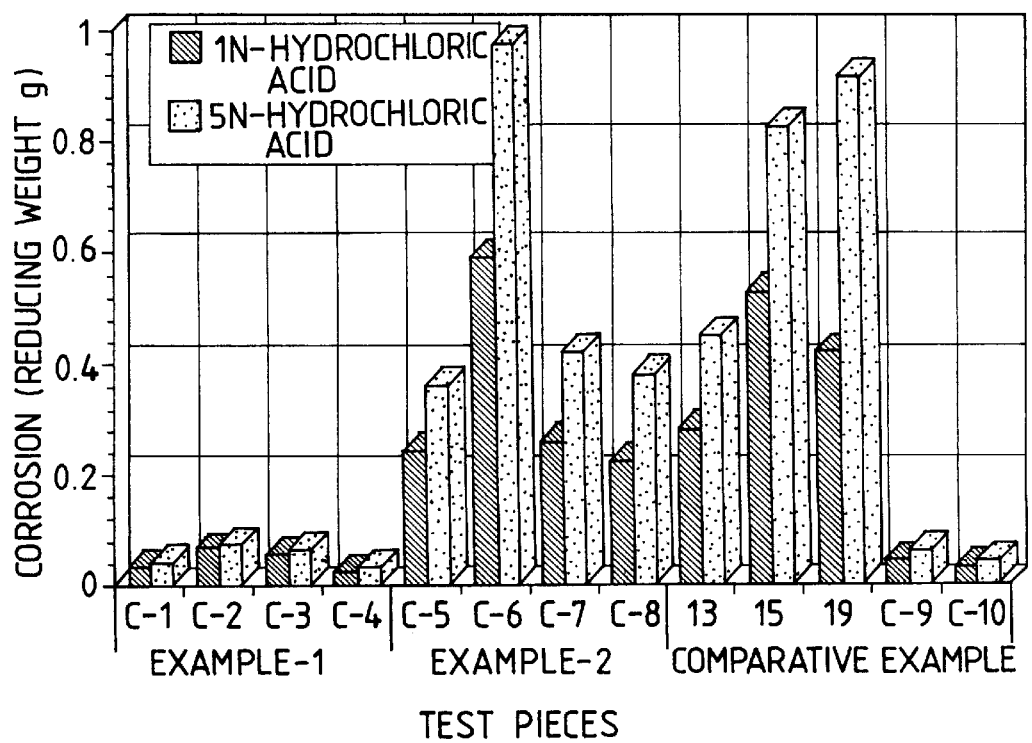
FIG. 18 shows the results of the hydrochloric acid immersion test for each test piece.

In the sulfuric acid and hydrochloric acid immersion test, test pieces each having a diameter of 18 mm and a thickness of 10 mm were immersed in a 1N solution and in a 5N solution for 20 hours at a room temperature and then the test pieces were evaluated by measuring their respective amounts of decrease in weight. FIG. 17 shows the results of the sulfuric acid immersion test. FIG. 18 shows the results of the hydrochloric acid immersion test.

In the lithium bromide solution immersion test, after the lithium bromide solution was previously bubbled by Ar gas for 2 hours and was thereby desired, the solution was kept at a temperature of 35° C., the test pieces were respectively immersed in this solution for one week, and the test pieces were evaluated by judging their respective outer appearances.

Also, as a life test, a life test under clean oil bath lubrication and a life test in the water were respectively conducted under the following conditions:
(Life test under the clean oil bath lubrication)
This test was conducted similarly to the test previously described in connection with the examples of the rolling device (A) such as a rolling bearing or the like.
Test Machine:
  Mori-type Thrust Rolling Life Test Machine
  Contact Pressure: 4900 MPa
  Number of Revolutions: 1000 rpm
  Lubrication Oil: Turbine oil No. 68
(Life test in the water)
This test was conducted similarly to the test previously described in connection with the examples of the rolling devices (C) and (D) such as a rolling bearing or the like.
Test Machine:
  Underwater Thrust Life Test Machine shown in FIG. 15
  Load: 150 kgf Number of Revolutions: 1000 rpm The test pieces used in the above tests were those of a thrust ball bearing No. 51305 in which six rolling elements were formed of silicon nitride (in the case of a hybrid bearing) or SUS440C, and cage is formed of fluororesin.

The results of the above-mentioned life test are shown in Table 8.

In the test pieces C-1 to C-8 stated in the Example-1 and Example-2, since carbon contained in the alloy composition is replaced by nitrogen, it is possible to prevent generation of large-size carbides which are harmful to the acoustic characteristic and rolling life of the rolling device, which results in the good rolling fatigue life of the rolling device. Also, in the salt water spray test and lithium bromide solution immersion test as well, it was confirmed that the test pieces C-1 to C-8 stated in the Example-1 and Example-2 are better in corrosion resistance than the test pieces of the comparative example. Especially, the test pieces according to the invention, in which a suitable amount of Ni and Cu is added to the alloy composition, are found far better in corrosion resistance.

TABLE 8

| | Test Pieces | Steel Species | Lives under Lubricating Condition In a Clean Oil Bath ($\times 10^7$ cycles) | Underwater Lives ($\times 10^6$ cycles) |
|---|---|---|---|---|
| Example-1 | C-1 | W | 11.3 | 17.8 |
| | C-2 | X | 10.6 | 18.3 |
| | C-3 | Y | 10.8 | 17.4 |
| | C-4 | Z | 11.9 | 16.9 |
| Example-2 | C-5 | R | 11.8 | 15.4 |
| | C-6 | E | 10.6 | 17.1 |
| | C-7 | Q | 10.7 | 18.3 |
| | C-8 | P | 11.4 | 18.8 |
| Comparative Example | 13 | H | 7.6 | 3.2 |
| | 15 | I | 1.7 | 2.8 |
| | 19 | M | 6.3 | 2.4 |
| | C-9 | A' | 3.4 | 1.8 |
| | C-10 | C' | 2.9 | 1.6 |

Also, as can be seen clearly from FIGS. 17 and 18, the test pieces W, X, Y, and Z of the Example-1 are better, especially in resistance to a sulfuric acid and to a hydrochloric acid, than the test pieces of the Example-2 and comparative example. In the test pieces R, E, Q, and P of Example-2, the contents of Ni and Cu are lower than 0.5 wt %, Cu content according to the present invention. Therefore, they are worse in corrosion resistance to a hydrochloric acid which provides the severest corrosive environment, and near to the test pieces of the comparative example rather than the test pieces of the Example-1. However, since the test pieces of Example-2 contain the Ni and Cu contents of 0.05 wt % which is the lower limit or more, they are clearly better in corrosion resistance to a sulfuric acid than those of the comparative example.

On the other hand, in the test piece A' of the comparative example, the content of Ni is more than 3.5 wt % which is the upper limit of the invention. For this reason, the test piece A' is good in corrosion resistance but is poor in hardness, with the result that the life of the test piece A' as a rolling device is short.

Also, in the test piece C' of the comparative example, although the respective component contents thereof satisfy the range of the invention, the condition equation, Ni %+2.4 Mn %+0.3 Cu %≦5.0 is not satisfied. For this reason, the amount of retained austenite increases to thereby unable to provide sufficient hardness to withstand the rolling fatigue, that is, due to short hardness, the life of the test piece C' as a rolling device is short.

Here, referring to the test piece B' of the comparative example in which the content of Cu is more than 3.5 wt % that is the upper limit of the invention, while the present test piece was under a hot forging operation which is necessary in a rolling device manufacturing process, a heat crack was generated in the test piece, which made it impossible to conduct the life test of the test piece any longer.

As described above, the rolling device (E) such as a rolling bearing or the like according to the invention, in which Ni and Cu are added to the alloy composition, are better in corrosion resistance than the conventional rolling devices even under a very special environment such as in water, in sea water, in an acid solution, in a halide solution, or in other similar environments, while carbides generated in the rolling device (E) are fine in size. Therefore, the rolling device (E) can provide a good rolling fatigue life.

Moreover, since the rolling device (E) basically satisfies the conditions of the rolling device (A) and has the superior corrosion resistance under the environment such as in the acid solution, rolling elements formed of ceramics such as silicon nitride may be used in the rolling device (E).

As described heretofore, in a rolling bearing according to the invention, with respect to stainless steel material which is used to form the rolling bearing, carbon, which not only has an undesirable influence on the corrosion resistance of the stainless steel material but also, when it is contained in a large amount in the stainless steel material, causes the generation of large-size eutectic carbides to thereby lower the function of the stainless steel material, is in part replaced by nitrogen having a solid solution strengthening action of substantially the same level as the carbon to thereby be able to restrict the carbon concentration within a specified ranges. Accordingly, the stainless steel according to the invention is far higher in corrosion resistance than the conventional martensitic stainless steel and is also capable of restricting the generation of the large-size eutectic carbides. As a result, according to the invention, as the effect thereof, there can be provided a rolling bearing or other rolling device which is excellent in corrosion resistance, acoustic characteristic, rolling fatigue life, wear resistance, high-temperature hardness, and the like, and, especially, which is much improved in corrosion resistance and fatigue life.

What is claimed is:

1. A rolling device comprising:
    an outer member;
    an inner member; and
    a plurality of rolling elements arranged between the outer and inner members, the outer member having a first contact surface which contacts the rolling elements, the inner member having a second contact surface which contacts the rolling elements, each of the rolling elements rolling against the first and second contact surfaces, wherein at least one of the outer member, inner member, and rolling elements is formed of steel containing:
    C of less than 0.6 wt %; Cr of 10.0 wt % to 22.0 wt %; Mn of 0.1 wt % to 1.5 wt %; Si of 0.1 wt % to 2.0 wt %;
    N from 0.05 wt % to less than 0.2 wt %; Mo of 0 to 3.0 wt %;
    and V of 0 to 2.0 wt %; and the balance Fe and inevitable impurities,
    the steel satisfying C %+N %≧0.45 wt %, wherein
    the at least one of the outer member, inner member, and rolling elements has a structure containing retained austenite of 6 vol % or less after the structure is hardened, subzero treated and tempered.

2. A rolling device comprising:

an outer member;

an inner member; and a plurality of rolling elements arranged between the outer and inner members, the outer member having a first contact surface which contacts the rolling elements, the inner member having a second contact surface which contacts the rolling elements, each of the rolling elements rolling against the first and second contact surfaces, wherein at least one of the outer member, inner member, and rolling elements is formed of steel containing:

C of less than 0.6 wt %; Cr of 10.0 wt % to 22.0 wt %;

Mn of 0.1 wt % to 1.5 wt %; Si of 0.1 wt % to 2.0 wt %;

N from 0.05 wt % to less than 0.2 wt %; Mo of 0 to 3.0 wt %;

and V of 0 to 2.0 wt %; and the balance Fe and inevitable impurities, the steel satisfying C %+N % ≧ 0.45 wt %, wherein the at least one of the outer member, inner member, and rolling elements is formed of the steel satisfying 0.04 Cr %−0.83 N %−0.39 ≦ C % ≦ −0.05 Cr %+1.41, and contains one of eutectic carbides, carbon nitrides and nitrides which have a diameter of 20 μm or less, and wherein the at least one of the outer member, inner member, and rolling elements has a structure containing retained austenite of 6 vol % or less after the structure is hardened, subzero treated and tempered.

3. The rolling device of claim 1, wherein the at least one of the outer member, inner member, and rolling elements is formed of the steel containing: C of less than 0.5 wt %; Cr of 10.0 wt % to 14.0 wt %; Mn of 0.1 to 1.0 wt %; and N of 0.05 to 0.14 wt%, the steel satisfying C %+N % ≦ 0.65 wt %.

4. The rolling device of claim 2, wherein the structure contains eutectic carbides and undissolved carbides which are 2 μm or less in size and 5% or less of area fraction in total of the eutectic carbides and undissolved carbides.

5. The rolling device of claim 1, wherein the at least one of the outer member, inner member, and rolling elements is formed of said steel containing: C of less than 0.5 wt %; Cr of 10.0 to 16.0 wt %; Mn of 0.1 to 0.8 wt %; Ni of 0.05 wt % to 3.5 wt %; Cu of 0.05 wt % to 3.0 wt %, wherein the steel satisfies: 0.04 Cr %−0.83 N %−0.39 ≦ C % ≦ −0.05 Cr %+1.41; C %+N % ≧ 0.45 wt %; and Ni %+2.4 Mn %+0.3 Cu % ≦ 5.0%.

6. The rolling device of any one of claims 1–5, wherein at least one of the outer and inner members is formed of said steel containing C of less than 0.5 wt %, and the rolling elements are formed of ceramics of one of silicon nitride, zirconia and silicon carbide.

* * * * *